(12) United States Patent
Fuse

(10) Patent No.: US 7,210,341 B2
(45) Date of Patent: May 1, 2007

(54) FUEL QUANTITY ESTIMATE SYSTEM

(75) Inventor: Toru Fuse, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 106 days.

(21) Appl. No.: 11/090,247

(22) Filed: Mar. 25, 2005

(65) Prior Publication Data

US 2005/0247123 A1    Nov. 10, 2005

(30) Foreign Application Priority Data

Mar. 26, 2004  (JP)  ............................. 2004-092710

(51) Int. Cl.
*G01F 17/00*  (2006.01)
(52) U.S. Cl. ...................... 73/149; 73/290 R
(58) Field of Classification Search .................. 73/149, 73/290 R, 290 V
See application file for complete search history.

(56) References Cited

U.S. PATENT DOCUMENTS

| | | | | |
|---|---|---|---|---|
| 4,352,159 A | * | 9/1982 | Colby | ........................ 702/52 |
| 4,553,431 A | * | 11/1985 | Nicolai | ...................... 73/290 B |
| 5,826,459 A | * | 10/1998 | Kataoka et al. | ........... 73/290 R |
| 6,666,084 B2 | * | 12/2003 | Schelhas et al. | .......... 73/290 R |

\* cited by examiner

*Primary Examiner*—Hezron Williams
*Assistant Examiner*—Rodney Frank
(74) *Attorney, Agent, or Firm*—Honigman Miller Schwartz & Cohn LLP

(57) ABSTRACT

A device for calculating a quantity of fuel in a fuel tank for a fuel cell vehicle is provided. The device includes a first quantity determining system that provides a first quantity value representing said quantity of fuel in said fuel tank based on a physical condition associated with said fuel in said fuel tank, a second quantity determining system that provides a second quantity value representing said quantity of fuel in said fuel tank, and an error correction system that generates an error value based upon the first quantity value and the second quantity value. A method for calculating a quantity of fuel in a fuel tank for a fuel cell vehicle is also disclosed.

29 Claims, 24 Drawing Sheets

FUEL QUANTITY ESTIMATE SYSTEM

CROSS-REFERENCE TO RELATED APPLICATION

This application is based on and claims the benefit of priority from Japanese Patent Application No. 2004-092710, filed on Mar. 26, 2004, the entire contents of which are incorporated herein by reference.

BACKGROUND

A device, such as a fuel tank, that stores hydrogen and feeds hydrogen to a fuel cell of a fuel cell vehicle typically includes a measuring device for measuring the quantity of hydrogen in the fuel tank. The measuring device determines the quantity of hydrogen in the tank based on a pressure and a temperature of the hydrogen in the tank.

BRIEF SUMMARY OF THE INVENTION

A device for calculating a quantity of fuel in a fuel tank for a fuel cell vehicle is disclosed. The device includes a first quantity determining system that provides a first quantity value representing said quantity of fuel in said fuel tank based on a physical condition associated with said fuel in said fuel tank, a second quantity determining system that provides a second quantity value representing said quantity of fuel in said fuel tank, and an error correction system that generates an error value based upon the first quantity value and the second quantity value. A method for calculating a quantity of fuel in a fuel tank for a fuel cell vehicle is also disclosed.

BRIEF DESCRIPTION OF THE DRAWINGS

The present invention will now be described, by way of example, with reference to the accompanying drawings, in which.

DETAILED DESCRIPTION

Figure 1:
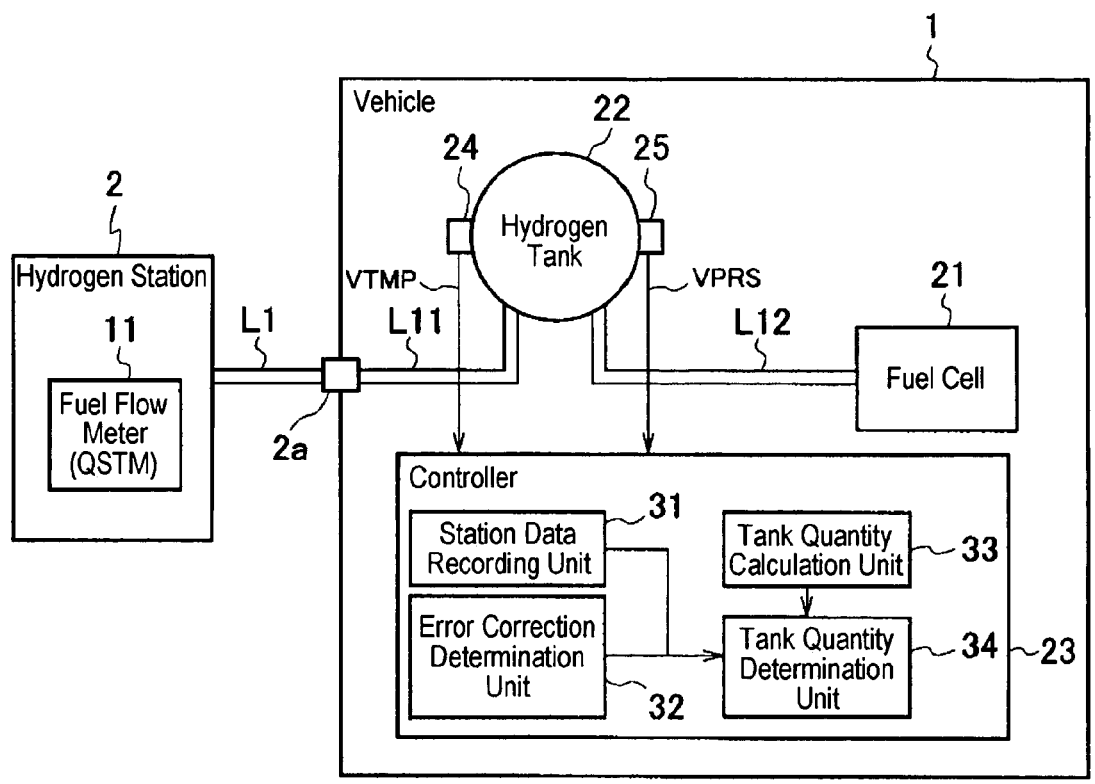
FIG. 1 illustrates a schematic diagram according to an embodiment of a fuel supply system according to the present invention.

Referring to FIG. 1, a fuel supply system for a fuel cell vehicle 1 according to an embodiment of the present invention is shown and described. In FIG. 1, the fuel supply system feeds hydrogen from hydrogen station 2 to fuel cell vehicle 1 when hydrogen station 2 is connected to fuel cell vehicle 1. In one embodiment, hydrogen station 2 is a stationary station. However, one skilled in the art will readily recognize that other configurations, such as a mobile hydrogen station, may also be employed.

Hydrogen station 2 is equipped with a fuel flow meter 11 for measuring the quantity of hydrogen supplied to fuel cell vehicle 1. In one embodiment, the fuel flow meter 11 measures this quantity by calculating the weight of the hydrogen supplied to fuel cell vehicle 1. The quantity of hydrogen supplied to fuel cell vehicle 1 is measured when fuel flow meter 11 is connected to controller 23 of fuel cell vehicle 1. Of course, one skilled in the art will readily recognize that other means for calculating the quantity of hydrogen supplied to the fuel cell vehicle 1 may be used in conjunction with the fuel flow meter 11.

Hydrogen station 2 is equipped with a hydrogen storage tank, which stores hydrogen for fueling fuel cell vehicles such as fuel cell vehicle 1. In an embodiment, the hydrogen station 2 also includes a valve for starting and stopping the flow of hydrogen into fuel cell vehicle 1 and a controller which regulates the flow rate of hydrogen into fuel cell vehicle 1. In an embodiment, hydrogen station 2 is connected to fuel cell vehicle 1 by a connecting pipe L1 when feeding hydrogen into fuel cell vehicle 1.

In an embodiment, fuel cell vehicle 1 is equipped with a fuel cell 21 which uses hydrogen to generate power. Fuel cell vehicle 1 also includes a hydrogen tank 22 which receives hydrogen supplied by hydrogen station 2. Fuel cell vehicle 1 also includes a controller 23 that calculates the quantity of hydrogen in hydrogen tank 22.

Fuel cell 21 generates power by feeding hydrogen and oxidizing agents into a tank and then effectuating an electrochemical reaction that consumes the hydrogen and oxidizing agents. The power generated from this reaction is then converted into vehicle power for providing running power to operate and/or drive the fuel cell vehicle 1.

In an embodiment, fuel cell vehicle 1 is equipped with fuel supply port 2a to which pipe L1 is connected. The fuel cell vehicle 1 also includes a fuel supply pipe L11 which connects fuel supply port 2a and hydrogen tank 22. Additionally, a hydrogen pipe L12 connects hydrogen tank 22 and fuel cell 21. Hydrogen is supplied to hydrogen tank 22 from hydrogen station 2 through connecting pipe L1, fuel supply port 2a and fuel supply pipe L1. Such supply is able to occur when connecting pipe L1 is connected to fuel supply port 2a. Additionally, hydrogen is supplied to fuel cell 21 from hydrogen tank 22 through fuel supply pipe L12. Oxidizing agents are supplied to fuel cell 21 by an oxidizing agent supply device (not shown in the Figure).

In an embodiment, fuel cell vehicle 1 is equipped with temperature sensor 24 that detects the temperature of hydrogen in hydrogen tank 22 and pressure sensor 25 that detects the pressure of hydrogen in hydrogen tank 22. Detected temperature and pressure values are read and recognized by controller 23 as temperature VTMP and tank pressure VPRS respectively.

Controller 23 includes a RAM (Random Access Memory), a storage memory, and a ROM (Read Only Memory) that are used to facilitate calculations that will be described in greater detail hereinafter. The controller 23 also includes a CPU (Central Processing Unit) which performs calculations according to a program or programs stored in the ROM. The controller 23 is also equipped with an input and output interface circuit which allows for input and output signals to operate functional parts of devices such as station data recording unit 31, error correction determination unit 32, tank quantity calculation unit 33, and tank quantity determination unit 34. As will be described in greater detail, controller 23 performs learning operations with respect to the tank quantity to correct an estimated quantity of hydrogen in hydrogen tank 22.

Figure 2:
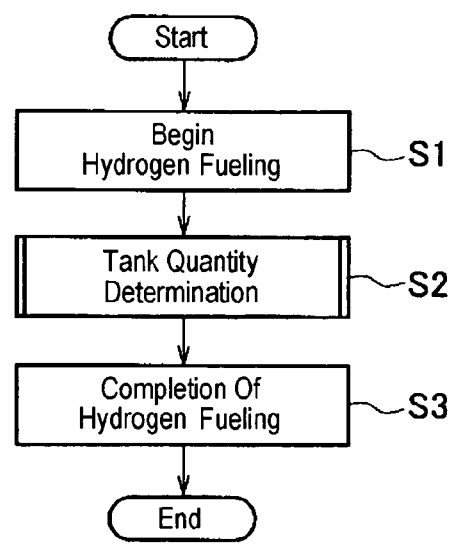
FIG. 2 illustrates a flowchart according to an operation of an embodiment of the present invention.

Referring now to FIG. 2, a process for determining a quantity of hydrogen in the hydrogen tank 22 according to an embodiment of the present invention will be described. The process illustrated with respect to FIG. 2 is described in connection with fuel cell vehicle 1 and the fuel supply system described above. However, one skilled in the art will readily recognize that other supply system configurations may be used in connection with the embodiments described herein, and the present embodiments are not limited to those disclosed herein.

In an embodiment, the process for determining the quantity of hydrogen in tank 22, referred to as tank quantity determination process, is performed when supplying hydrogen to fuel cell vehicle 1 while fuel cell vehicle 1 is connected to hydrogen station 2. In an embodiment, the tank quantity determination process is not performed while the vehicle is running or stopping.

Therefore, in the embodiment described with respect to FIG. 2, step S1 begins after confirming that hydrogen is not being supplied to fuel cell 21 from hydrogen tank 22 and detecting that fuel cell vehicle 1 and hydrogen station 2 are connected via fuel supply port 2a.

In step S1, fueling of hydrogen to hydrogen tank 22 is performed after a valve (not shown in the Figure), connected between connecting pipe L1 and hydrogen station 2, is opened. The fuel cell vehicle 1 may begin fueling after a valve along fuel supply pipe L11, which is connected between hydrogen tank 22 and fuel supply port 2a, is opened. However, one skilled in the art will readily recognize that other valve arrangements besides those described herein may be used in connection with the embodiments of the present invention.

In step S2, fuel cell vehicle 1 determines the quantity of hydrogen inside hydrogen tank 22, otherwise referred to as the tank quantity. In step S3, hydrogen fueling is completed. Fuel cell vehicle 1 may then be operated.

Figure 3:
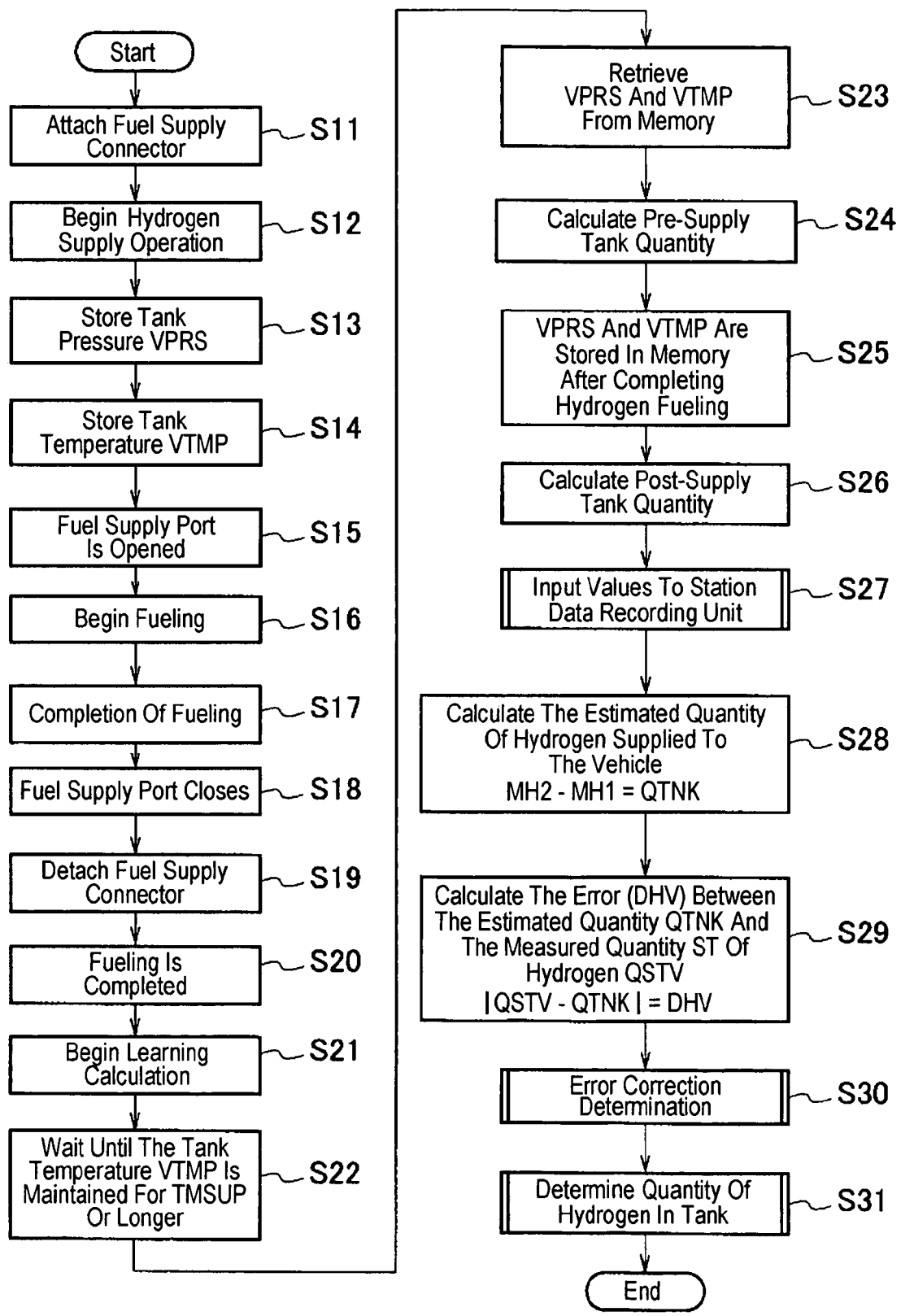
FIG. 3 illustrates a flowchart according to an operation of an embodiment of the present invention.

With reference to FIG. 3, an embodiment for the process of step S2 of FIG. 2 for determining the tank quantity is described. In an embodiment, this process is performed while supplying hydrogen to tank 22. The process shown in FIG. 3 begins at step S111 where controller 23 detects whether fuel supply port 2a is connected to pipe L1. Once connection is confirmed, hydrogen is then supplied to hydrogen tank 22 from hydrogen station 2 in step S12.

In step S13, controller 23 reads the detected value from pressure sensor 25 and stores it as tank pressure VPRS in memory. In step S14, controller 23 reads the detected value from temperature sensor 24 and stores tank temperature VTMP in memory. It should be noted that, other physical characteristics or conditions besides temperature and pressure may be used to determine the quantity of hydrogen (as will be discussed) in the fuel tank. The acquisition of temperature and pressure allows controller 23 to acquire tank pressure VPRS and temperature VTMP before supplying hydrogen to hydrogen tank 22. It should be noted that step S13 and step S14 may be performed in any order or simultaneously and that the embodiments of the present invention are not limited to the orientation disclosed herein.

Next, in step S15, the fuel supply port 2a is opened, which allows fueling to commence (step S16) and hydrogen to be supplied to hydrogen tank 22 of fuel cell vehicle 1. Next, in step S17, completion of hydrogen fueling is detected. Then, in step S18, fuel supply port 2a is closed. In step S19, pipe L1 is disconnected from fuel supply port 2a. Hydrogen supply is completed in step S20.

Hydrogen station 2 measures the quantity of hydrogen in hydrogen tank 22 and stores the measured value in memory. In one embodiment, hydrogen station 2 measures the quantity of hydrogen supplied to hydrogen tank 22 with a fuel flow meter 11. And, this measured value is stored in memory after hydrogen has been completely supplied.

In step S21, controller 23 begins performing the tank quantity determining process upon detecting disconnection of connection pipe L1 from fuel supply port 2a. In step S23, tank temperature and pressure is retrieved. Because hydrogen is supplied to hydrogen tank 22 from hydrogen station 2 during steps S15 to S18, temperature VTMP inside hydrogen tank 22 becomes momentarily higher than that compared with the temperature before hydrogen fueling. Therefore, step S22 allows a time period to elapse and step S23 is performed after this time period (TMSUP) to allow the temperature in the hydrogen tank 22, detected by temperature sensor 24, to stabilize.

Figure 4:
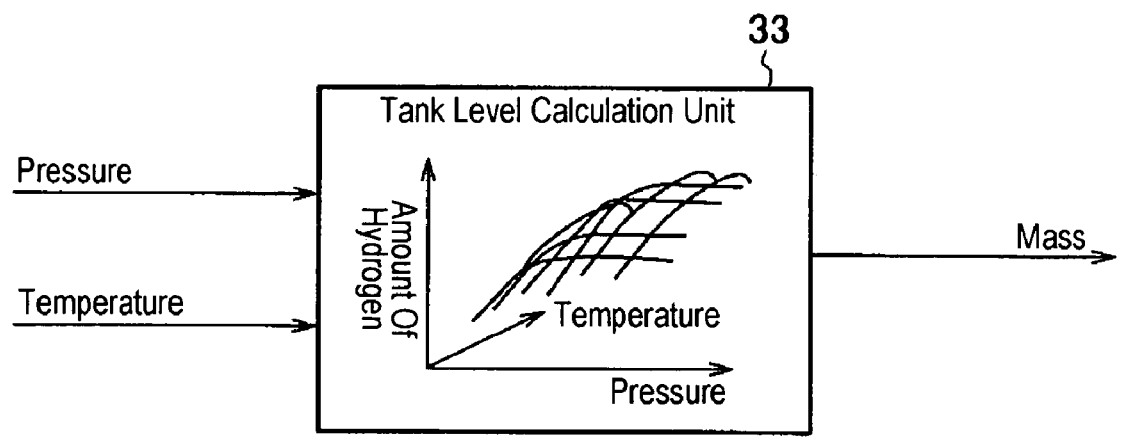
FIG. 4 illustrates a graphical view according to an embodiment of the present invention.

In step 23, controller 23 reads tank pressure VPRS and tank temperature VTMP that was determined and stored in steps S13 and S14 before hydrogen fueling began. Then, in step S24, tank quantity calculation unit 33 calculates the pre-supply hydrogen tank quantity (MH1). This pre-supply condition (MH1) represents the quantity of hydrogen in the tank before the hydrogen fueling operation, described above, was performed. For tank quantity calculation unit 33 to determine (MH1), the values of tank pressure VPRS and tank temperature VTMP are input as shown in FIG. 4. The pre-supply hydrogen tank quantity (MH1) is determined according to hydrogen tank quantity map data that has been compiled based on calculation results according to van der Waals formula (understood by one skilled in the art) based on a change in tank pressure VPRS and tank temperature VTMP. This map data is designed in a way in which a higher tank pressure corresponds to a higher hydrogen tank volume and a higher temperature corresponds to a lower hydrogen tank volume. Accordingly, the quantity of hydrogen inside the tank may be set according to the tank pressure range and tank temperature range that have been determined during testing.

As discussed above with respect to step S24, tank quantity calculation unit 33 determines MH1 (pre-supply tank quantity) according to van der Waals formula based on the tank pressure VPRS and tank temperature VTMP taken before hydrogen was supplied. Designating P, T and V for pressure, temperature and volume respectively, hydrogen mass is calculated according to the following formula:

$$(P+(n^2 \cdot a)/V^2) \cdot (V-nb) = nRT \quad \text{Equation 1}$$

In Equation 1, "a" and "b" indicate correction coefficients according to van der Waals formula. Here, "a" is a correction factor for intermolecular attraction and "b" is for the molecular volume. When the hydrogen flow rate map data from FIG. 4 is not used, the pre-supply hydrogen tank quantity (MH1) is estimated by substituting P and T for tank pressure VPRS and tank temperature VTMP respectively to determine n (number of moles). Because the resulting equation is typically cubic, it is preferable to use the map data for hydrogen flow rate in FIG. 4 unless controller 23 has a high calculation ability.

Next, in step S25, tank pressure VPRS and tank temperature VTMP are determined based on controller 23 reading and storing detected values from pressure sensor 25 and temperature sensor 24 after hydrogen fueling is complete. In step S26, post-supply hydrogen tank quantity (MH2) is calculated by tank quantity calculation unit 33 by the same procedures as those in step S24. The post-supply hydrogen tank quantity represents the quantity of hydrogen in tank 22 after hydrogen has been supplied to the tank, as described above.

Figure 5:
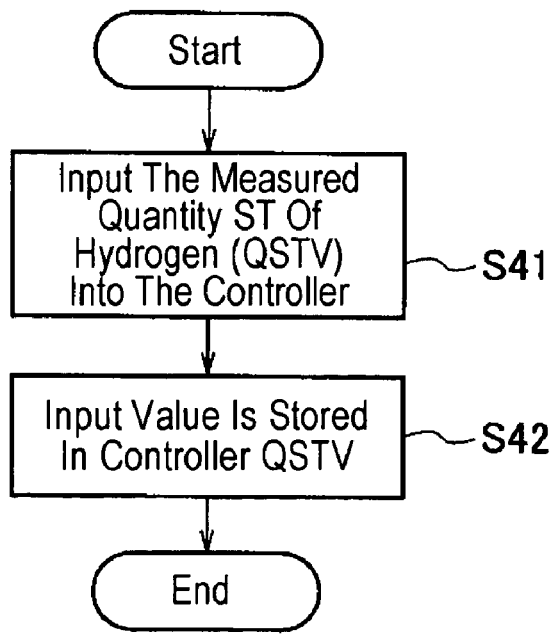
FIG. 5 illustrates a flowchart according to an operation of an embodiment of the present invention.

Next, in step S27, controller unit 23 inputs data from hydrogen station 2 into station data recording unit 31. Referring now to FIG. 5, a process according to an embodiment of the present invention is shown with respect to importing data from hydrogen Station 2 into station data recording unit 31. As shown in FIG. 5, station data recording unit 31 records the quantity of hydrogen supplied QSTV (obtained using fuel flow meter 11) by hydrogen station 2 in step S41. In step S42, the measured quantity ST of supplied hydrogen QSTV is stored in memory.

Referring again to FIG. 3, In step S28, controller 23 calculates the estimated quantity of hydrogen supplied to the tank 22, QTNK, based on the difference between the hydrogen tank quantity before hydrogen was supplied to the tank 22 that was estimated in step S24 and the estimated quantity of hydrogen that was supplied in step S26.

In step S29, controller 23 calculates an error value DHV for the calculation performed in step S28. This calculation is based on the calculated absolute value of the difference between the estimated quantity of hydrogen supplied to the tank 22 QTNK and the value of the measured quantity ST of hydrogen supplied to the tank 22 that was stored in step S27. This error value DHV refers to the error in the estimated quantity of hydrogen based on the measured supply of hydrogen determined by using fuel flow meter 11. The error value DHV may include significant error due to manufacturing variations in the capacity of hydrogen tank 22, error resulting from van der Waals formula, and small errors such as correction error for the hydrogen tank quantity data map (FIG. 4).

In one embodiment, the error DHV is calculated by the quantity correction determination unit 32. Based on the error value DHV obtained by quantity correction determination unit 32 in step S29, controller 23 then, in step S30, determines whether to conduct a learning process to correct the estimated quantity of hydrogen supplied to the tank 22 QTNK calculated in step S28.

Figure 6:
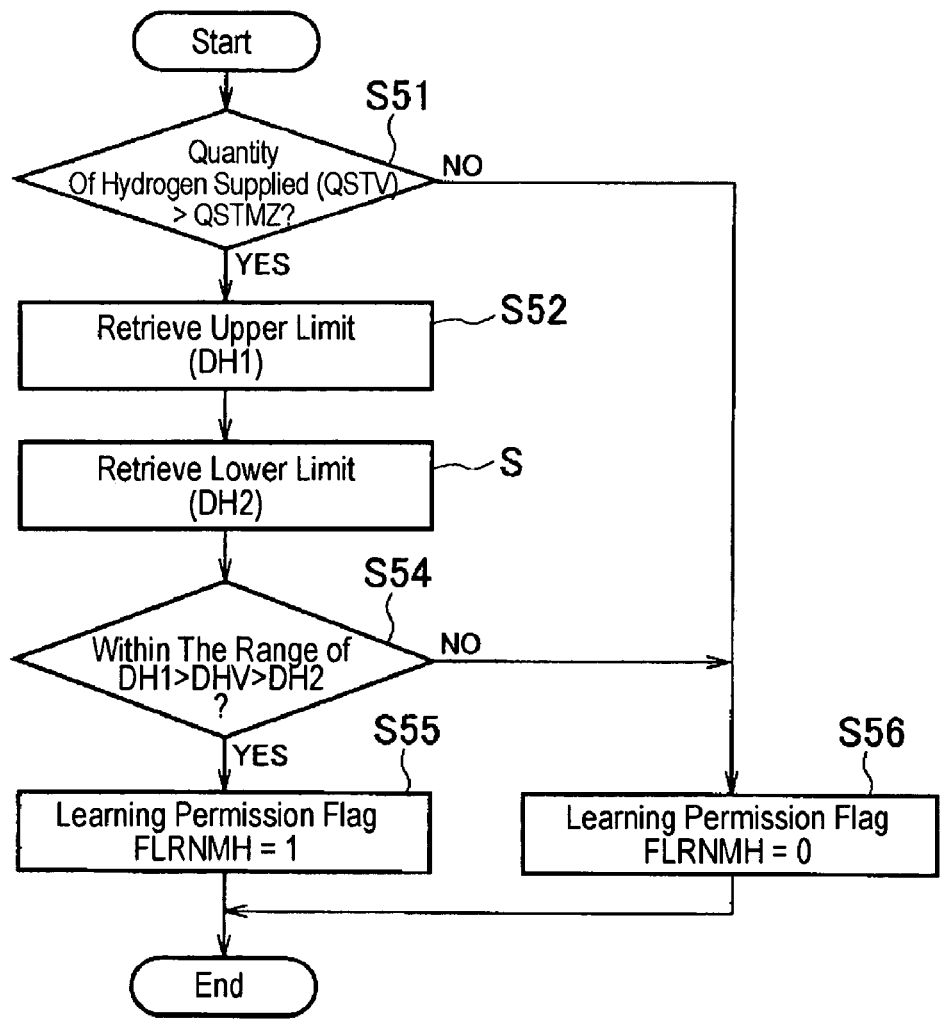
FIG. 6 illustrates a flowchart depicting an operation of an embodiment of the present invention.

To determine whether a learning process should be performed in step S30, in an embodiment, a process is performed as described with respect to FIG. 6. In step S51 of the process described in FIG. 6, quantity correction determination unit 32 determines whether the measured quantity ST of supplied hydrogen QSTV is greater that a specified value QSTMX. If the measured quantity ST is greater than QSTMX, the process proceeds to step S52. If not, the process moves to step S56.

QSTMX is a value used to determine whether a sufficient quantity of hydrogen has been supplied to hydrogen tank 22 from hydrogen station 2. If QSTV has not exceeded the specified value QSTMX, the rate of error value DHV against the quantity of supplied hydrogen increases. Accordingly, the tank quantity is corrected to prevent an increase in incorrect learning. The specified value of QSTMX is set according to the variations in the capacity of hydrogen tank 22.

If the measured quantity ST of supplied hydrogen QSTV in step S51 is smaller than the specified value (QSTMX), a learning permission flag "0" FLRNMH is assigned in step S56 to indicate that the learning process in step S31 (see FIG. 3) should not be performed.

If the measured quantity ST is greater than QSTMX in step S51, the quantity correction determination unit 32 calculates an upper error limit DH1 that allows the execution of the learning process, as will be described in greater detail, based on the learning permission range table in FIG. 7 in step S52. The quantity correction determination unit 32 also calculates a lower limit of the error value DH2 in step S53 according to the same procedures as in step S52.

Figure 7:
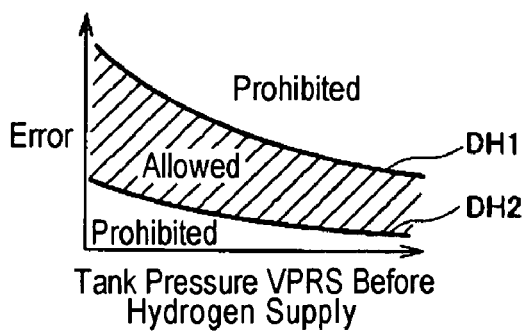
FIG. 7 illustrates a graphical view according to an embodiment of the present invention.

The learning permission range table in FIG. 7 shows the error range that allows execution of the learning process for the tank pressure, stored in step S13, before hydrogen was supplied to the tank 22. The table of FIG. 7, in an embodiment, is prepared in advance through conducting tests. The upper limit is estimated by controller 23 for variations in the capacity of hydrogen tank 22 and variations in pressure sensor 24 and temperature sensor 25. From this, the upper error limit DH1 is determined.

In step S54, in an embodiment, if error value DHV (determined in step S29) is greater than the upper error limit DH1, controller 23 prohibits execution of the learning process because of the possibility of errors due to controller 23 or hydrogen station 2. Accordingly, a "0" is assigned for learning permission flag FLRNMH in step S56.

Alternatively, a value below the lower error limit DH2 causes the controller 23 to prohibit the execution of the learning process, as errors below this value become insignificant as they may occur through malfunction or similar causes that may mask the actual error in the quantity of hydrogen. Therefore, if the error value DHV, determined in step S29 (see FIG. 3), is lower than DH2, quantity correction determination unit 32 prohibits execution of the learning process by assigning a value of "0" to the learning permission flag FLRNMH in step S56.

If the error value DHV, determined in step S29, is between the upper error limit DH1 and the lower error limit DH2, quantity correction determination unit 32 assigns a value of "1" to flag FLRNMH in step S55. This allows the execution of the learning process in step S31.

In an embodiment, DH1 and DH2 define a learning permission range as shown in FIG. 7. In an embodiment, this range allows calculation errors to be corrected that are caused by major error introducing events such as, for example, manufacturing variations in hydrogen tank 22. Other corrected errors may include calculation errors due to van der Waals formula. Additionally, other errors may include those based on map information, which are typically smaller than those caused by the variations in the capacity of tank 22. One skilled in the art will readily recognize variations to these errors as well as other errors that may be considered and corrected.

Figure 8:
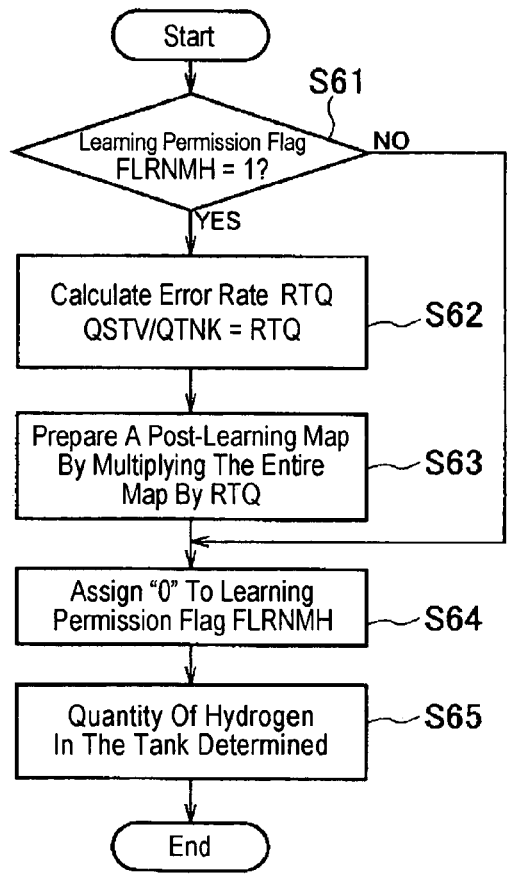
FIG. 8 illustrates a flowchart according to an embodiment of the present invention.

After step S30, controller 23 determines the quantity of hydrogen inside the tank 22 in step S31. FIG. 8 illustrates one embodiment of a process for performing this determination. As shown in FIG. 8, in step S61, quantity correction determination unit 32 allows advancement to step S62 if the learning permission flag FLRNMH is "1." If the flag is "0", however, then the process proceeds to step S64.

In step S62, tank quantity determination unit 34 calculates the error rate RTQ (QSTV/QTNK) between the measured quantity ST of supplied hydrogen QSTV and the estimated quantity of hydrogen supplied QTNK. In step S63, the tank quantity determination unit 34 multiplies the quantity of hydrogen (difference between the pre-supply hydrogen tank quantity (MH1) and post-supply hydrogen tank quantity (MH2)) in the map data shown in FIG. 4 by the error rate RTQ. The resultant data concerning the quantity of hydrogen will be referred to as the "learned hydrogen flow rate map."

Figure 9:
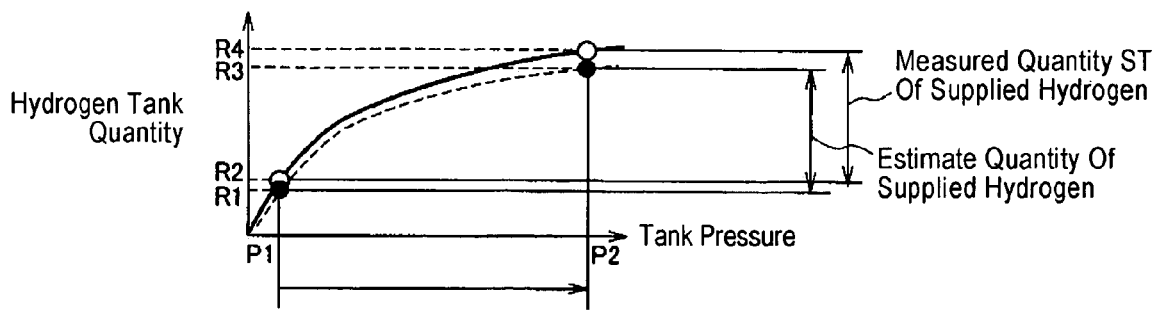
FIG. 9 illustrates a graphical view according to an embodiment of the present invention.

The estimated quantity of hydrogen supplied to the tank 22 QTNK is multiplied by the error rate RQT so that the relationship between tank pressure VPRS and the hydrogen tank quantity are as shown in FIG. 9 (dotted line) when tank pressure VPRS is P1. The estimated quantity of hydrogen supplied to the tank 22 QTNK is R1 when tank pressure VPRS is P1, and R3 when the tank pressure VPRS is P2. The estimated quantity of hydrogen supplied to the tank 22 QTNK is determined by multiplying by the error rate RQT. The measured quantity ST of supplied hydrogen is R2 when the tank pressure VPRS is P1, and R4 when the tank pressure VPRS is P2 as shown by the solid line in FIG. 9. Therefore, the estimated quantity of hydrogen supplied to the tank 22 QTNK can be corrected according to the measured value ST of supplied hydrogen QSTV by determining the tank quantity.

Figure 10:
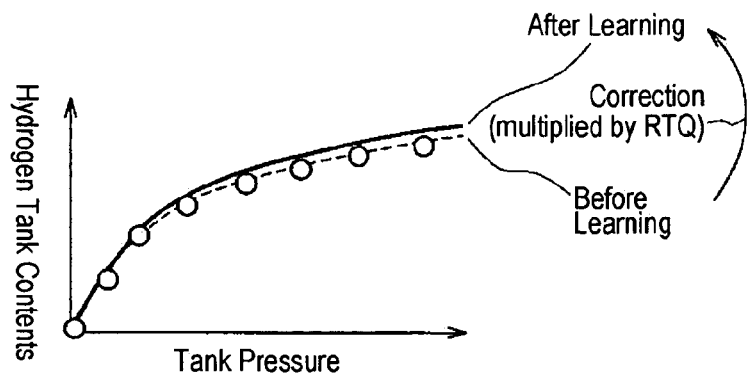
FIG. 10 illustrates a graphical view according to an embodiment of the present invention.

As shown in FIG. 10, by repeating similar calculations under various tank pressures, it is possible to obtain a tank pressure curve. Multiplying the tank pressures represented by the dotted line by the error rate RTQ results in the solid line indicating the hydrogen tank quantity over the entire tank pressure range.

With continued reference to FIG. 8, tank quantity determination unit 34 completes the learning operation in step S65 after a "0" is assigned to learning flag FLRNMH by quantity correction determination unit 32 in step S64. Accordingly, controller 23 is able to estimate the quantity of hydrogen in the hydrogen tank after performing a correction analysis using the hydrogen flow rate map data shown in FIG. 4 and the tank pressure VPRS and tank temperature VTMP.

A fuel supply system according to another embodiment of the present invention is now described. For clarity, the description of elements described in connection with the previous embodiments are omitted and like numerals are used for like elements.

In an embodiment, the fuel supply system allows manual input of the measured quantity ST obtained from fuel flow meter 11 of the hydrogen supplied to the tank 22 QSTV, the value of which is provided from hydrogen station 2 to controller 23. The fuel supply system is equipped with a data input system that is connected to hydrogen station 2 or controller 23. The data input system allows for numeric input of the measured value from fuel flow meter 11 via keyboard or touch panel.

When hydrogen station 2 is equipped with this type of input system, the measured quantity ST of supplied hydrogen QSTV may be confirmed by manual input. The measured quantity ST of hydrogen supplied to the tank 22 QSTV can also be manually input. When the input system of hydrogen station 2 is electrically connected to controller 23 of fuel cell vehicle 1, such as for example by a maintenance connector on fuel cell vehicle 1, station data recording unit 31 allocates a new input channel that allows an input of signal, entered by the input channel, from the input system to be received and stored as the measured quantity ST of hydrogen supplied to the tank 22 QSTV.

Additionally, a touch panel or other means on a navigation system for the fuel cell vehicle 1 may be used as the input system. The measured value ST, input by an operator, is stored as the measured value ST of hydrogen supplied to the tank 22 by station data recording unit 31. When this data is input from the navigation system, station data recording unit 31 allocates an input channel that allows for recognition of the measured value ST of supplied hydrogen QSTV when the navigation system is switched to a mode that allows for the input of the measured value ST of supplied hydrogen QSTV.

Fuel cell vehicle 1 records the station data (steps S41 and S42 in FIG. 5) in step S27 (see FIG. 3) by a simple process, such as by allocating an input channel to hydrogen station 2 and fuel cell vehicle 1, when hydrogen is supplied by hydrogen station 2 to hydrogen tank 22.

A fuel supply system according to another embodiment of the present invention is now described. For clarity, the description of elements described in connection with the previous embodiments are omitted and like numerals are used for like elements.

In an embodiment, the fuel supply system allows for an automatic input of the measured value ST of supplied hydrogen QSTV. In the embodiment, the fuel supply system is equipped with a wireless interactive LAN (Local Area Network) communication system with an identical protocol for both hydrogen station 2 and fuel cell vehicle 1. It is then possible to input the measured value ST of supplied hydrogen QSTV to station data recording unit 31 by providing a communication line for the wireless LAN.

After hydrogen is supplied to tank 22 from hydrogen station 2, and connection pipe L1 and fuel supply port 2a (step S19) are disconnected, the interactive LAN communication system, incorporated into hydrogen station 2, transmits a wireless signal indicating the measured quantity ST of supplied hydrogen QSTV after reading the value measured by fuel flow meter 11.

For the wireless LAN communication system of fuel cell vehicle 1, upon detecting a wireless signal transmitted from the wireless LAN communication system from hydrogen station 2, the data representing the measured value ST of supplied hydrogen QSTV, provided in the wireless signal, is recorded by station data recording unit 31.

The station data recording unit 31 of the fuel cell vehicle 1, in an embodiment, automatically records the measured quantity ST of supplied hydrogen QSTV while supplying hydrogen to hydrogen tank 22 from hydrogen station 2.

Figure 11:
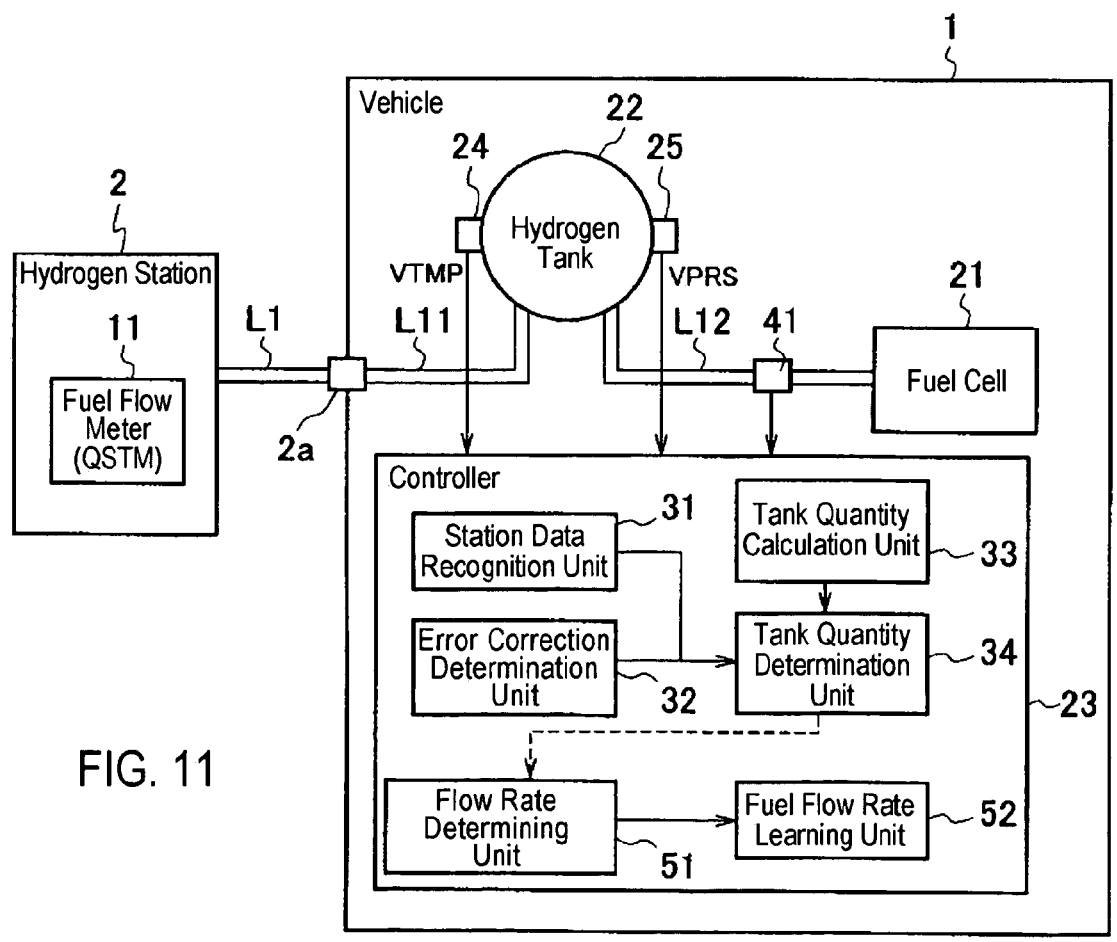
FIG. 11 illustrates a schematic view according to an embodiment of the present invention.

Referring now to FIG. 11, a fuel supply system according to another embodiment of the present invention is now described. For clarity, the description of elements described in connection with the previous embodiments are omitted and like numerals are used for like elements. In FIG. 11, an embodiment is shown equipped with fuel supply pipe L12 having a fuel flow merer 41, a controller 23 with a tank quantity determing unit 51 and fuel flow rate learning unit 52. In the described embodiment, an error value for the fuel flow meter 41 is determined while fuel cell vehicle 1 is powered by fuel cell 21.

In the described embodiment, fuel cell vehicle 1 corrects for variations in the hydrogen flow rate to fuel cell 21. Such variations can be caused by adjustments in the accelerator pedal that opens a valve provided along the hydrogen supply pipe L12. The valve allows hydrogen to be supplied to the fuel cell 21 during operation. The fuel flow meter 41 of the fuel cell vehicle 1 allows for a change in the flow rate of hydrogen to fuel cell 21 from hydrogen tank 22 based on the power generation required by fuel cell 21.

Fuel cell vehicle 1, in an embodiment, performs a learning operation with respect to the hydrogen flow rate into fuel cell 21 to correct for variations in hydrogen flow rate, detected by fuel flow meter 41, based on the quantity of hydrogen inside hydrogen tank 22 that was corrected during fueling as described in previous embodiments.

Figure 12:
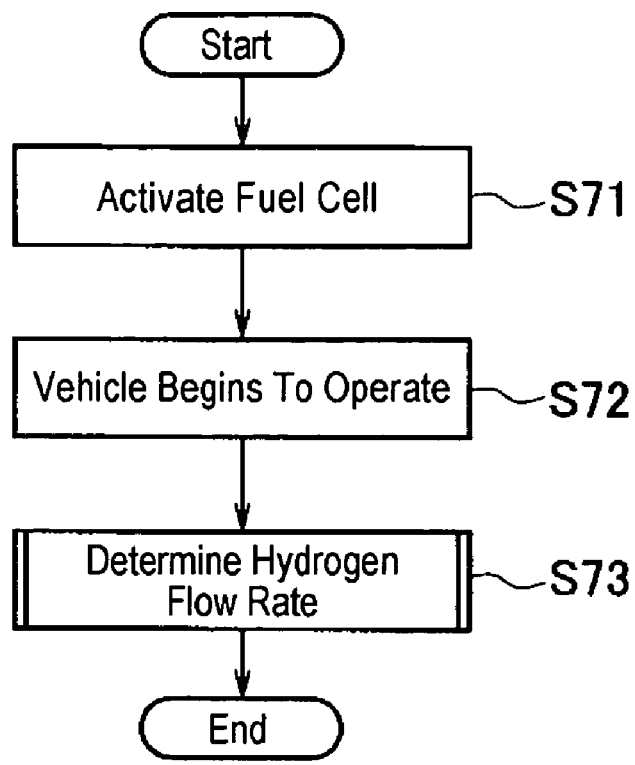
FIG. 12 illustrates a flow chart according to an embodiment of the present invention.

Referring now to FIG. 12, one embodiment of the learning process, discussed above, is shown and described. As shown in step S71 of FIG. 12, after hydrogen station 2 completes fueling of fuel cell vehicle 1 and after the value representing the quantity of hydrogen inside hydrogen tank 22 has been corrected, fuel cell vehicle 1 is permitted to operate. In step S72, the vehicle beings to be operated. Next, in step S73, the hydrogen flow rate, measured by fuel flow meter 41, is determined.

Figure 13:
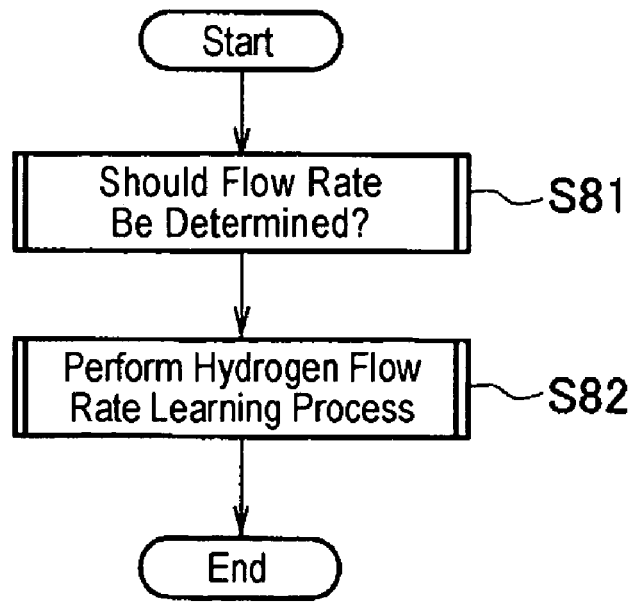
FIG. 13 illustrates a flowchart according to an embodiment of the present invention.

Referring to FIG. 13, the process of step S73 is described in greater detail. The process for determining the hydrogen flow rate first determines whether the hydrogen flow rate should be determined for the value measured by fuel flow meter 41 in step S81. In an embodiment, step S81 is carried out by flow rate learning determination unit 51. If the process in step S81 determines that the flow rate should be determined, the process moves to step S82. The hydrogen flow rate determining process, step S82, in one embodiment, is described with respect to the steps outlined in FIGS. 14 to 25. The determined value for the hydrogen flow rate, measured by fuel flow meter 41, is corrected by performing the processes described in FIGS. 26 to 32. In an embodiment, the steps outlined in FIGS. 26 to 32 are performed by fuel flow rate learning unit 52.

Figure 14:
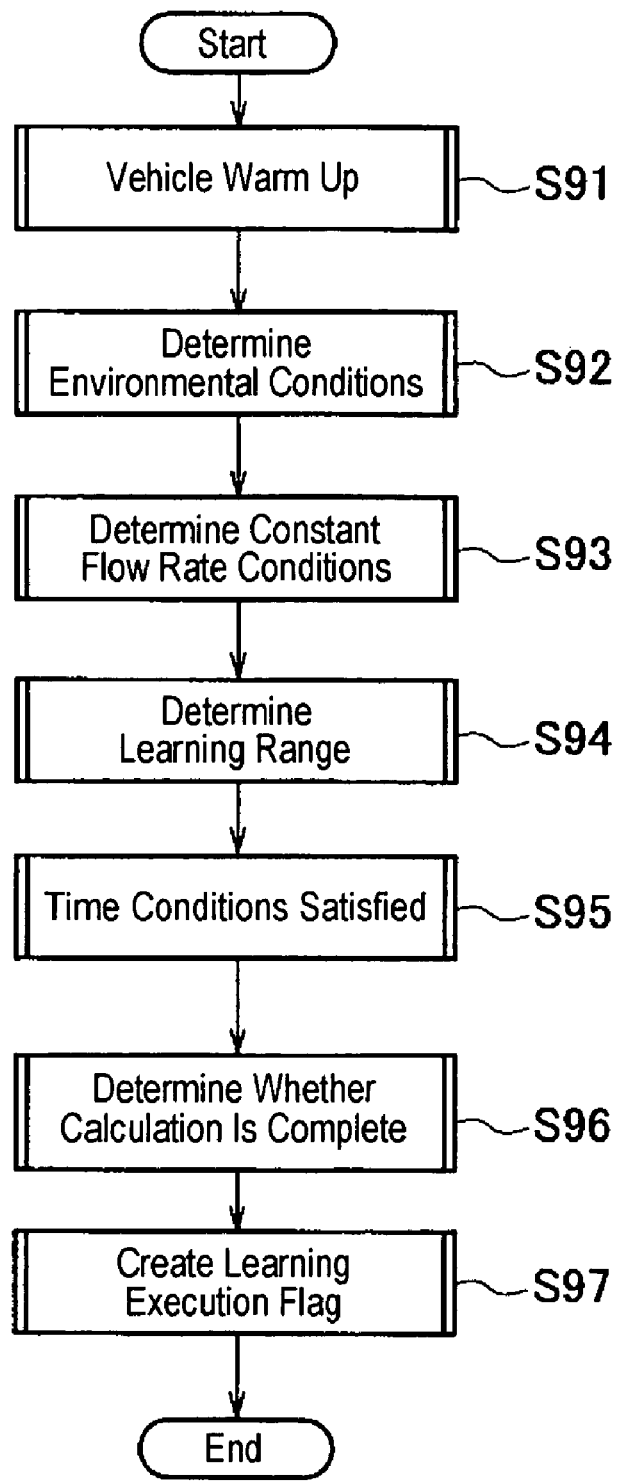
FIG. 14 illustrates a flowchart according to an embodiment of the present invention.

Step S81 is described with respect to FIG. 14. As shown in FIG. 14, the process first examines the warm up conditions of each area of the vehicle in step S91. In an embodiment, the process examines the ambient environmental conditions in step S92, examines the constant flow rate conditions as measured by fuel flow meter 41 in step S93, and examines the other conditions related to a learning range for constant flow rate conditions as measured by fuel flow meter 41 in step S94. In step S95, the process examines time conditions during which warm up, environmental, and constant flow rate conditions are maintained relating to the calculated flow rate measured by fuel flow meter 41. Step S96 determines whether calculations are complete. Step S97 creates a learning execution flag for determining whether flow rate measurement is to be carried out.

Figure 15:
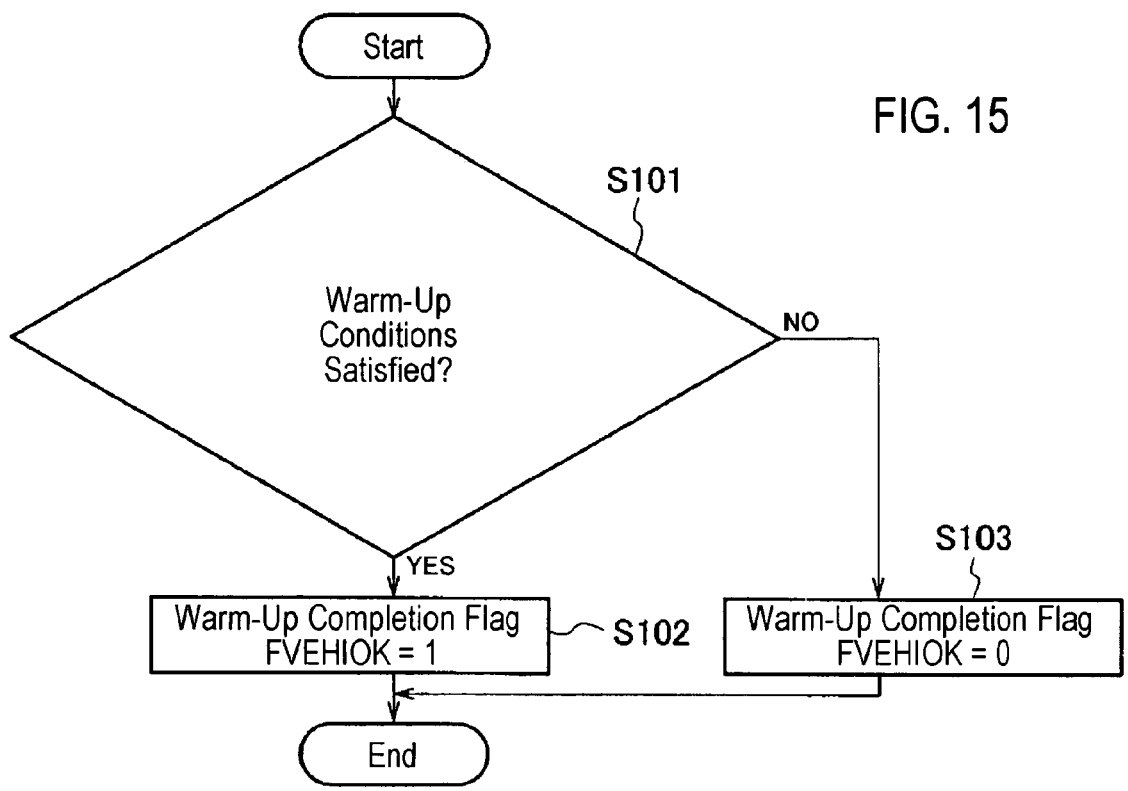
FIG. 15 illustrates a flowchart according to an embodiment of the present invention.

Step S91 checks whether the fuel cell vehicle 1 is warmed up. This ensures that the temperatures of the respective vehicle components and of fuel flow meter 41 are at normal operating conditions. With reference to FIG. 15, fuel flow rate learning determination unit 51 checks whether the following five conditions are met to perform the step S91. One skilled in the art will readily recognize that other means may be used to check whether the vehicle 1 is warmed up.

First, in step S101, the fuel flow rate learning determination unit 51 checks whether the temperature of water circulated inside fuel cell 21 to regulate temperature of fuel cell 21 is at a first specified temperature. Additionally, fuel flow rate determination unit 51 checks whether there is more than one occurrence of fuel cell vehicle 1 exceeding a specified speed. Determination unit 51 also checks to see whether there is more than one occurrence of the power generated by fuel cell 21 exceeding a first specified value. Determination unit 51 further checks to see whether there is more than one occurrence of the power generated by fuel cell 21 exceeding a second specified value. Determination unit 51 checks to see whether a temperature of representative areas in the motor and battery that generate running torque exceed a specified temperature.

During this process, fuel flow rate flow rate learning determination unit 51 reads a sensor signal from the temperature sensor in the water circulation passages that are connected to fuel cell 21. Additionally, fuel flow rate learning determination unit 51 determines that the first condition, as described above, is met when the temperature of fuel cell 21 after warm-up exceeds the specified temperature.

For the second condition, flow rate learning determination unit 51 detects a signal from a fuel cell vehicle speed sensor, and confirms that the third condition is met when the current vehicle speed exceeds the specified vehicle speed, which indicates that fuel cell 21 is generating power normally and supplying power to the motor.

For the third condition, fuel flow rate learning determination unit 51 detects a sensor signal from a sensor that detects the power generated by fuel cell 21. Additionally, the flow rate learning determination unit 51 determines that the third condition is met when earlier power generation of fuel cell 21 is not less than a given or predetermined first value, indicating fuel cell 21 is now generating power normally.

Fuel flow rate learning determination unit 51 confirms that the fourth condition is met when the quantity of power generated by fuel cell 21, as detected by a sensor (e.g. greater than the specified minimum power generation), meets or exceeds the second specified value.

For the fifth condition, flow rate learning determination unit 51 detects a sensor signal from temperature sensors in or attached to the motor and battery. The flow rate learning determination unit 51 confirms that the fifth condition is met when the mean temperature of the motor and battery, after a specified period of time, indicates the motor and battery are operating normally.

When the first through fifth conditions are met, flow rate learning determination unit 51 confirms that the fuel cell vehicle 1 is warmed up, and the process shown in FIG. 15 proceeds to step S102 to assign a "1" to warm-up completion flag FVEHIOK. If all conditions have not been met, however, the flow rate learning determination unit 51 determines that a fuel cell vehicle 1 is not warmed up, and the process shown in FIG. 15 proceeds to step S103 to assign a "0" to warm-up completion flag FVEHIOK. By completing vehicle warm-up, each part of the fuel cell vehicle 1 operates under normal conditions while driving. This helps avoid incorrect learning during the transient period of power generation status of fuel cell 21.

Figure 16:
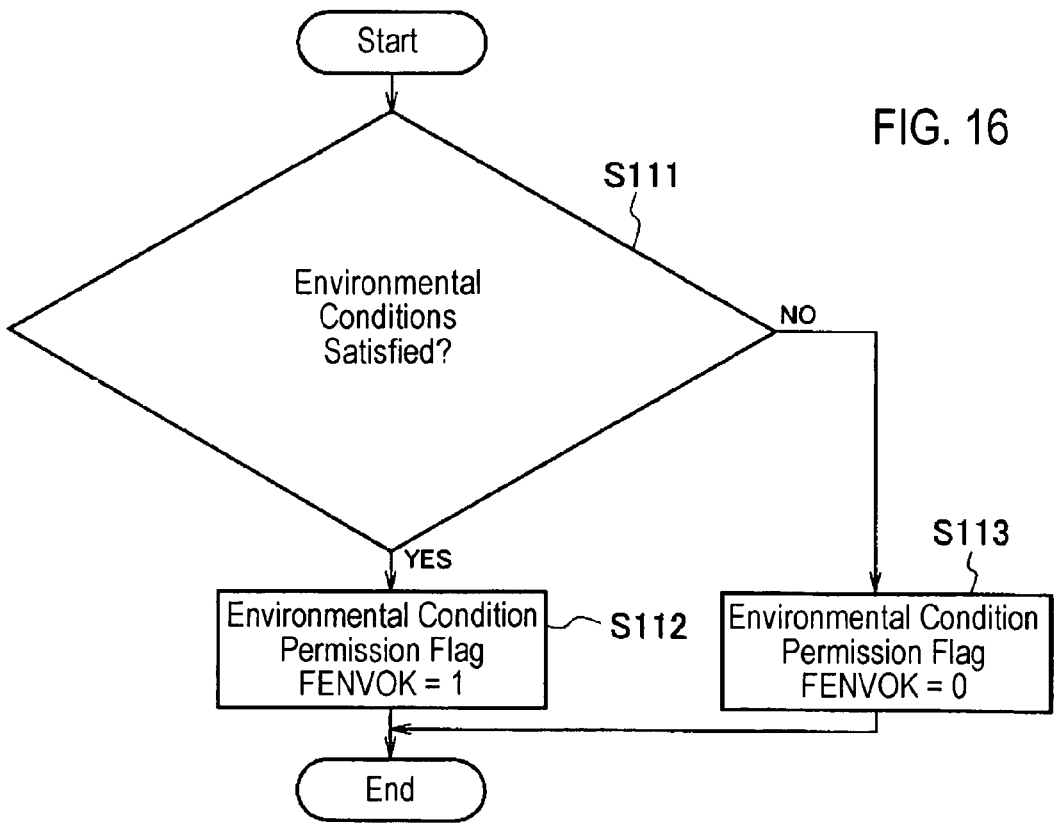
FIG. 16 illustrates a flowchart according to an embodiment of the present invention.

Referring again to FIG. 14, The process then proceeds to step S92 for determining the status of environmental conditions. Step S92 checks whether hydrogen and oxidant supply to fuel cell 21 is being performed under suitable environmental conditions with respect to the performance of fuel cell vehicle 1 for performing the learning process. FIG. 16 illustrates one embodiment of a process for determining whether the environmental conditions set forth in step S92 in FIG. 14 are sufficient for the fuel cell vehicle 1 to undergo the learning process. However, it will be understood that other processes besides those disclosed in FIG. 16 may be used to determine whether the environmental conditions are sufficient.

In step S111, the first condition to be met is whether the atmospheric temperature is within a specified range. The second condition is whether the temperature of hydrogen tank 22 is within a specified range with respect to the outside air temperature. The third condition is whether the pressure inside hydrogen tank 22 is within a specified range. The fourth condition is whether there are no abnormalities in the fuel cell generation system. The fifth condition is whether the tank quantity has already been measured by a primary assessment system at least once. Of course, one skilled in the art will readily recognize that other means may be used to ascertain the environmental conditions, and the present embodiments are not limited to those disclosed herein.

During the process of step S111, flow rate learning determination unit 51 receives input from a sensor signal from an ambient air temperature sensor. The flow rate learning determination unit 51 determines that the first condition is met if the current ambient temperature is within a specified temperature range that does not excessively cool hydrogen tank 22. Flow rate learning determination unit 51 checks whether the current temperature of hydrogen tank 22 is within the specified range with respect to the outside air temperature based on input from the temperature sensor. If the temperature of the hydrogen tank 22 is within the specified range, the first condition is met.

The criteria described above helps address situations where the temperature of the hydrogen deviates from the normal use range due to cooling in hydrogen supply pipe L12, even when the hydrogen supplied to fuel cell 21 is warm. Additionally, the criteria described above helps address situations where the temperature of hydrogen supplied to the fuel cell 21 varies due to a significant difference between the temperature of hydrogen tank 22 and the outside air temperature. Of course, one skilled in the art will readily understand that this criteria may address other situations besides those described herein.

For the next condition, flow rate learning determination unit 51 checks whether the tank pressure of hydrogen tank 22 is within a specified range by use of pressure sensor 25. When the pressure of the tank is within the specified range, the third condition is met. When the tank pressure falls below the specified range, the error might become significant due to performance of pressure sensor 25. Likewise, when the tank pressure rises above the specified limit, the variation may be significant. Both of these situations can cause incorrect learning. The criteria for this condition helps prevent such erroneous learning.

For the next condition, flow rate learning determination unit 51 checks whether there are any abnormalities in the fuel cell power generation system. The fuel cell power generation system, in one embodiment, controls the power of fuel cell 21 by supplying hydrogen, oxidant, and pure water to fuel cell 21. If the flow rate learning determination unit 51 confirms that there are no problems, the fourth condition is met. The criteria, in one embodiment, addresses fluctuations in the flow rate of hydrogen caused by abnormalities in the fuel cell power generation system, which could result in an unstable operation of fuel cell 21. Of course, one skilled in the art will readily understand that this criteria may address other situations besides those described herein.

Flow rate learning judgment unit 51 confirms that the fifth condition is met if the quantity of hydrogen inside the tank 22 has been calculated at least once. This condition, in one embodiment, helps assure accurate determination of the quantity of hydrogen in tank 22 based on an accurate estimate of the quantity of hydrogen supplied to the tank 22 QTNK, corrected as discussed in previous embodiments, and to confirm that an accurate estimate of the quantity of hydrogen supplied is stored in tank quantity determination unit 34. Of course, one skilled in the art will readily understand that this criteria may address other situations besides those described herein.

If flow rate learning determination unit 51 confirms that all of the conditions one through five are met, the environmental conditions for determining the hydrogen flow rate has been met, and a "1" is assigned to flag FENVOK in step S112. If any of the conditions one through five have not been met, a "0" is assigned to flag FENVOK in step S113 and the process proceeds to step S93 in FIG. 14.

Figure 17:
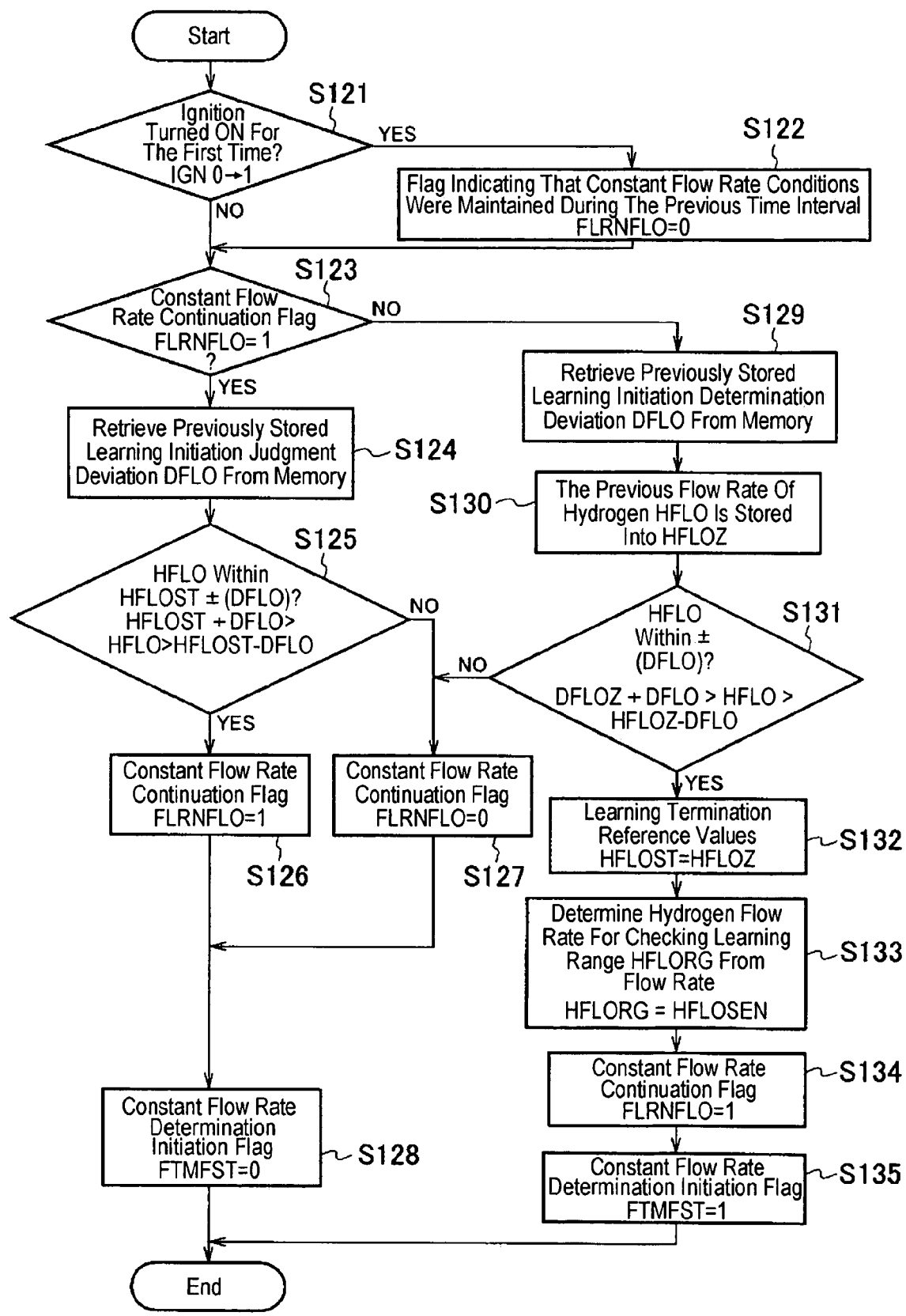
FIG. 17 illustrates a flowchart according to an embodiment of the present invention.

Step S93 checks whether a constant flow rate of hydrogen is maintained during the start of the learning process and while the learning process is being carried out. FIG. 17 illustrates the process of step S93 in greater detail. In FIG. 17, step S121 determines whether the vehicle ignition has been turned on for the first time. A flag is set indicating that the ignition SW status has been changed from "0" to "1" after the ignition SW has been operated for the first time. To perform this task, flow rate learning determination unit 51 determines that the ignition SW has been turned ON for the first time and allows the process to proceed to step S122. In step S122, the process assigns a "0" to constant flow rate continuation flag FLRNFLO. Steps S121 and S122 are an initialization process to help ensure that normal calculations are performed when determining the time conditions and determining to terminate the calculation process when the ignition switch is turned ON for the first time.

When the flow rate learning determination unit 51 determines that the ignition SW has been turned ON more than once, the process proceeds to step S123. In step S123, flow rate learning determination unit 51 checks whether a "1" has been assigned to FLRNFLO flag that indicates that constant flow rate was maintained in the previous flow. If so, processing in steps S124 to S128 are performed to determine whether the requirements for constant flow rate are currently met. If not, the process then proceeds to step S129 to establish a standard value for calculating the constant flow rate conditions when the ignition SW has been turned ON for the first time or when the quantity of hydrogen during the previous process for determining constant flow rate has changed significantly.

In step S124, flow rate learning determination unit 51 reads a learning initiation judgment deviation value DFLO. This value, DFLO, is used to check whether a constant flow rate is maintained based on the actual flow rate of hydrogen stored in memory, as will be described. The deviation (DFLO) refers to an allowable range for variation in the flow rate of hydrogen. A low value on the range is established so that the flow rate for each learning range RG of a plurality of learning ranges does not exceed the flow rate range.

Next, in step S125, flow rate learning judgment process 51 detects the value of the flow rate of hydrogen HFLO by reading a sensor signal representative of this flow rate from fuel flow meter 41 and checks whether the value of HFLO is within a specified range. In an embodiment, this range is defined as a learning termination reference value HFLOST plus or minus the learning initiation judgment deviation DFLO. When HFLO is within this range, a value of "1" is assigned to the flag (FLRNFLO) in step S126, indicating that constant flow rate has been maintained. If not, a process then proceeds to step S127, and a "0" is assigned to the flag (FLRNFLO).

In step S128, flow rate learning determination unit 51 assigns a value of "0" to constant flow rate judgment initiation flag FTMFST as the constant flow rate conditions have not been confirmed as met. The flag (FTMFST) is established only when a process has been performed for determining whether a constant flow rate is being maintained. A "1" is assigned as a flow rate learning trigger when constant flow rate conditions are determined to be met for the first time.

Alternatively, for determining a constant flow rate, in step S129, flow rate learning determination unit 51 reads learning initiation judgment deviation DFLO from memory. The value for DFLO was stored after a "0" was previously assigned to a flag indicating that a constant flow rate has been maintained. In step S130, the flow rate learning determination unit 51 stores the previous value for the flow rate of hydrogen HFLO as HFLOZ to distinguish it from the current flow rate of hydrogen HFLO.

In step S131, flow rate learning determination unit 51 checks whether the current flow rate of hydrogen HFLO, compared to the previously measured flow rate of hydrogen that was stored in step S130, meets parameters for maintaining constant flow rate conditions. The flow rate learning determination unit 51 detects the current flow rate of hydrogen HFLO from a signal provided by fuel flow meter 41, and checks whether it is within a range defined by the reference value hydrogen flow rate HFLOZ plus or minus DFLO (judgment initiation judgment deviation DFLO).

If the value is within the specified range, flow rate learning unit 51 allows the process to proceed to step S132. If not, the parameters for maintaining flow rate conditions are not met. In this case, a "0" is assigned to the flag (FLRNFLO) to indicate that constant flow rate conditions have been maintained in step S127. A "0" is also assigned to constant flow rate judgment initiation flag FTMFST in step S128 and the process is completed.

Figure 18:
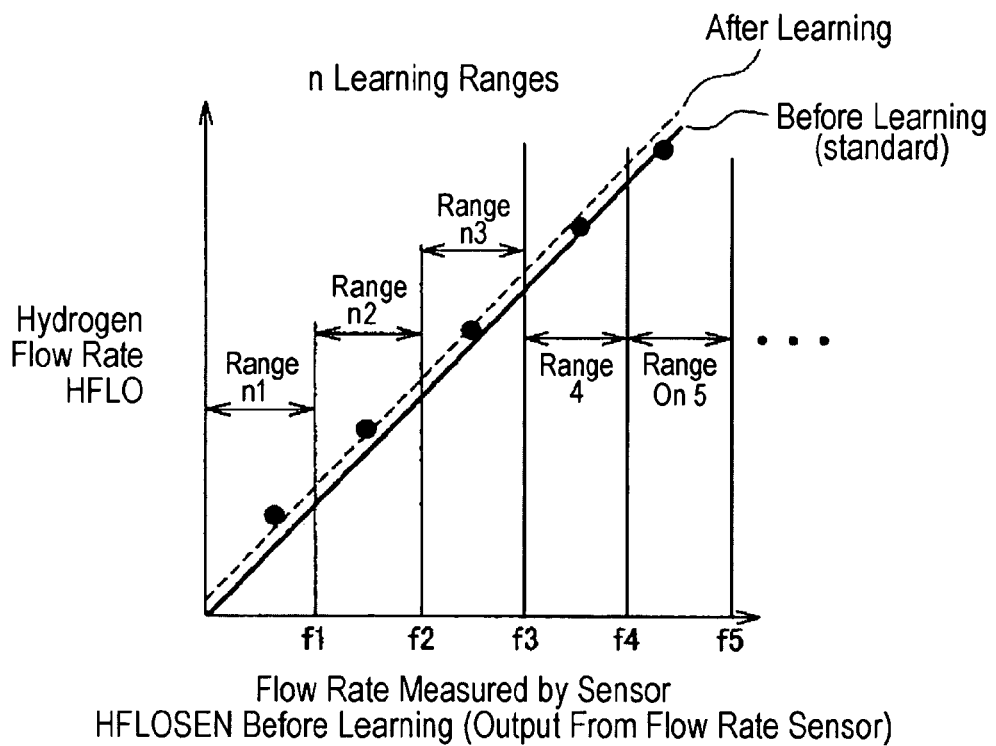
FIG. 18 illustrates a graphical view according to an embodiment of the present invention.
Figure 19:
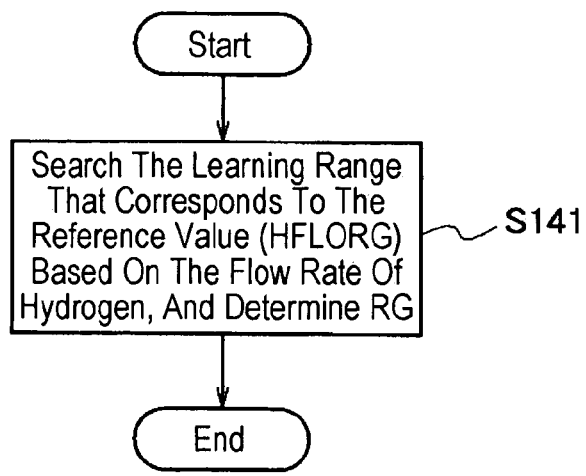
FIG. 19 illustrates a flowchart according to an embodiment of the present invention.

In step S132, flow rate learning determination unit 51 utilizes the flow rate of hydrogen HFLOZ that was stored previously in step S130 to determine learning termination reference value HFLOST. In step S133, the flow rate learning determination unit 51 calculates the hydrogen flow rate for checking the learning range HFLORG that is used to establish the flow rate range for learning, based on the value of the flow rate measured by the sensor HFLOSEN before learning has begun. HFLOSEN corresponds to the value measured by fuel flow meter 41. During this step, flow rate learning determination unit 51 assigns multiple ranges (n=1, 2, 3 . . . ) to the flow rate measured by the sensor HFLOSEN as shown in FIG. 18. The flow rate learning determination unit 51 calculates the mean value of the range of the current flow rate before learning, as measured by the sensor HFLOSEN, and uses this value as the hydrogen flow rate for determining the learning range (HFLORG).

Figure 20:
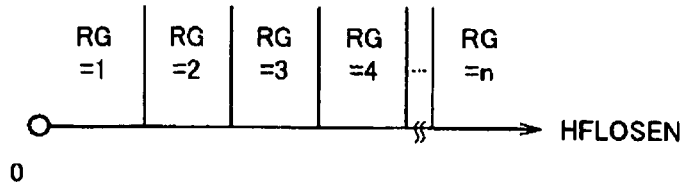
FIG. 20 illustrates a diagrammatical view according to an embodiment of the present invention.

In step S134, as shown in FIG. 17, flow rate learning determination unit 51 assigns a "1" to flag FLRNFLO indicating that constant flow rate conditions have been established. A "1" is also assigned to constant flow rate judgment initiation flag FTMFST in step S135 where the process is completed. After completion of this process, flow rate learning determination unit 51 allows the process to proceed to step S94 as shown in FIG. 14. In step S94, a process for determining the learning range is carried out. This process is described in greater detail with respect to FIG. 19. In step S141 of FIG. 19, the process for determining the learning range selects a learning range RG that indicates the flow rate range for calculating the hydrogen flow rate. At this point, flow rate learning determination unit 51 has stored data relating to the relationship between the value of flow rate measured by the sensor HFLOSEN before learning and the possible learning range RG as shown in FIG. 20. The flow rate learning determination unit 51 now stores the learning range RG that corresponds to the flow rate from the sensor before learning, and it allows the process to proceed to step S95 as shown in FIG. 14.

In step S95, a process for determining whether time conditions are satisfied and is performed. This process checks whether conditions, such as warm-up and environmental conditions, are maintained for a specified time or longer. After these conditions are met, the flow rate of hydrogen is continuously calculated while the conditions continue to be met. The process, in one embodiment, proceeds to execute the learning process when the warm-up and environmental conditions are no longer met. Although not necessary, such time conditions assist in providing more accurate learning, as they allow a longer time for warm-up and environmental conditions to be met and allow more values for the flow rate of hydrogen to be calculated, resulting in a more accurate determination.

Figure 21:
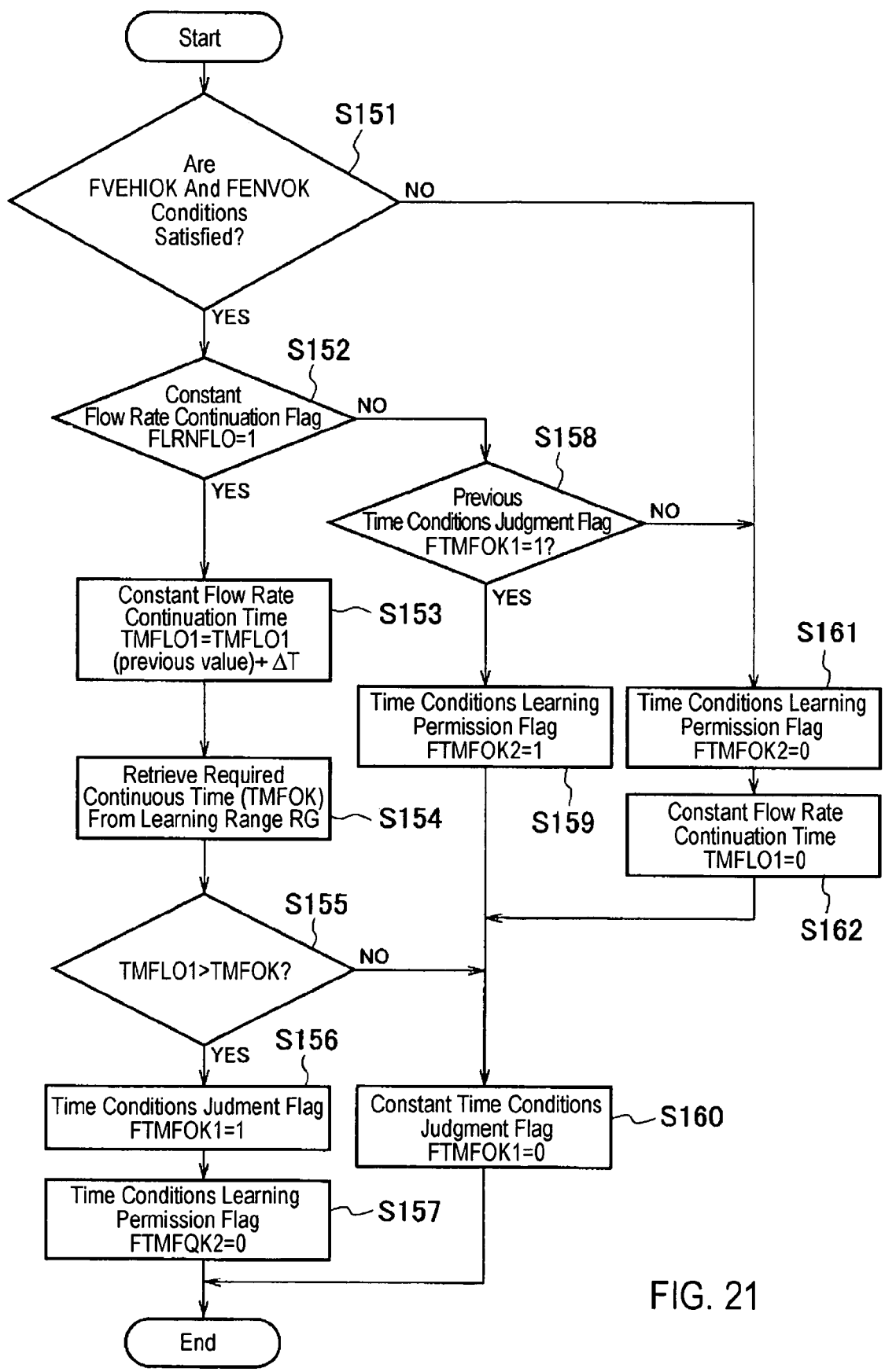
FIG. 21 illustrates a diagrammatical view according to an embodiment of the present invention.
Figure 22:
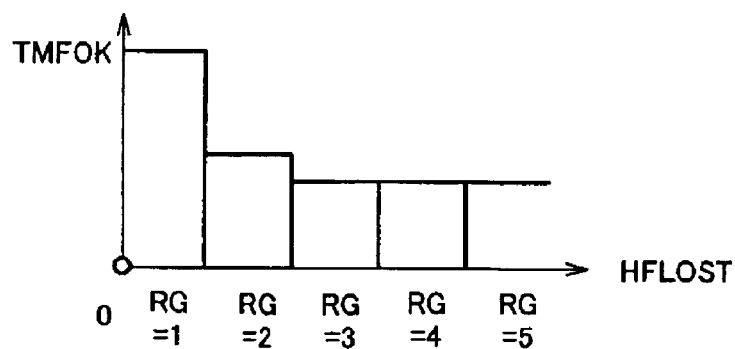
FIG. 22 illustrates a diagrammatical view according to an embodiment of the present invention.

Referring now to FIG. 21, the process for step 95 is described in greater detail. In step S151 of FIG. 21, flow rate learning determination unit 51 first checks whether a "1" is assigned to warm up completion flag FVEHIOK and environmental conditions permission flag FENVOK. Such an assignment indicates that the warm up and environmental conditions are met. If so, the process proceeds to step S152 to check for a flow rate condition flag. If the conditions of step S151 are not met, the process proceeds to step S161. In step S161, a "0" is assigned to time conditions learning permission flag FTMFOK2. A "0" is assigned to constant flow rate continuation time TMFLO1 in step S162 and a "0" is assigned to time conditions learning judgment flag FTMFOK1 in step S160. These assignments stop the system from performing further reading and determination.

With respect to the processes described herein, a value of "1" assigned to time conditions judgment flag FTMFOK1 indicates that the warm-up, environmental, and constant flow rate conditions are met. A "0" assigned to this flag indicates that the conditions are not met. Learning is performed when the warm-up, environment and constant flow conditions are met. A "1" is assigned to the time conditions learning permission flag FTMFOK2 as a trigger when the time, environmental and constant flow rate conditions are not met, and a "0" is assigned in all other cases.

In step S152, flow rate learning determination unit 51 checks whether a "1" is assigned to flag FLRNFLO indicating that constant flow rate has been maintained. If so, the process proceeds to step S153. If not, the process proceeds to step S158. In step S153, if the warm-up, environmental and constant flow rate conditions are met, flow rate learning determination unit 51 updates the current constant flow time TMFLO1 to equal the previous TMFLO1 reading plus a time increment ΔT.

Next, in step S154, flow rate learning determination unit 51 determines the time required for continuation TMFOK according to learning range RG which has been established by the time conditions judgment process. The flow rate learning determination unit 51 determines TMFOK according to the stored learning range RG based on the values in the continuation time table shown in FIG. 22. The flow rate learning determination unit 51 establishes a long additional required time (TMFOK) when the learning range RG is a "1" or "2." This indicates that the learning range reference number HFLOST is low.

In step S155, flow rate learning determination unit 51 checks whether the constant flow rate continuation time TMFLO1 determined in step S153 is greater than the additional continuation time TMFOK obtained in step S154. If so, the flow rate learning determination unit 51 confirms that the time conditions are met and assigns a "1" to time conditions judgment flag FTMFOK1 in step S156 or a "0" to time conditions judgment flag FTMFOK1 in step S160 to complete the process.

When flag FLRNFLO is not "1" in step S152, indicating that a constant flow rate has not been maintained, flow rate learning determination unit 51 checks whether the time conditions in the previous time conditions judgment cycle were met in step S158. If so, time conditions are determined to have been met and a "1" is assigned to time conditions learning permission flag FTMFOK2 in step S159, which allows the learning process to begin. If not, a "0" is assigned to time conditions judgment flag FTMFOK1 in step S161 as the constant flow rate conditions have not been met.

When the previous time conditions have not been met, step S158 moves the process to step S161 where a "0" is assigned to time conditions learning permission flag FTMFOK2. This indicates that a constant flow rate conditions have not been met for a given or predetermined amount of time or longer that is needed to maintain a constant flow rate TMFOK, even though the warm-up and environmental conditions have been met. In step S162, constant flow rate continuation time TMFLO1 is cleared by assigning a "0" to this flag, and the process proceeds to step S160.

Flow rate learning unit 51 sets time conditions judgment flag FTMFOK1 and time conditions learning permission flag FTMFOK2 according to the continuous time during which the warm-up, environmental, and constant time keeping conditions have been met, and the process proceeds to processing in step S96 in FIG. 14.

Figure 23:
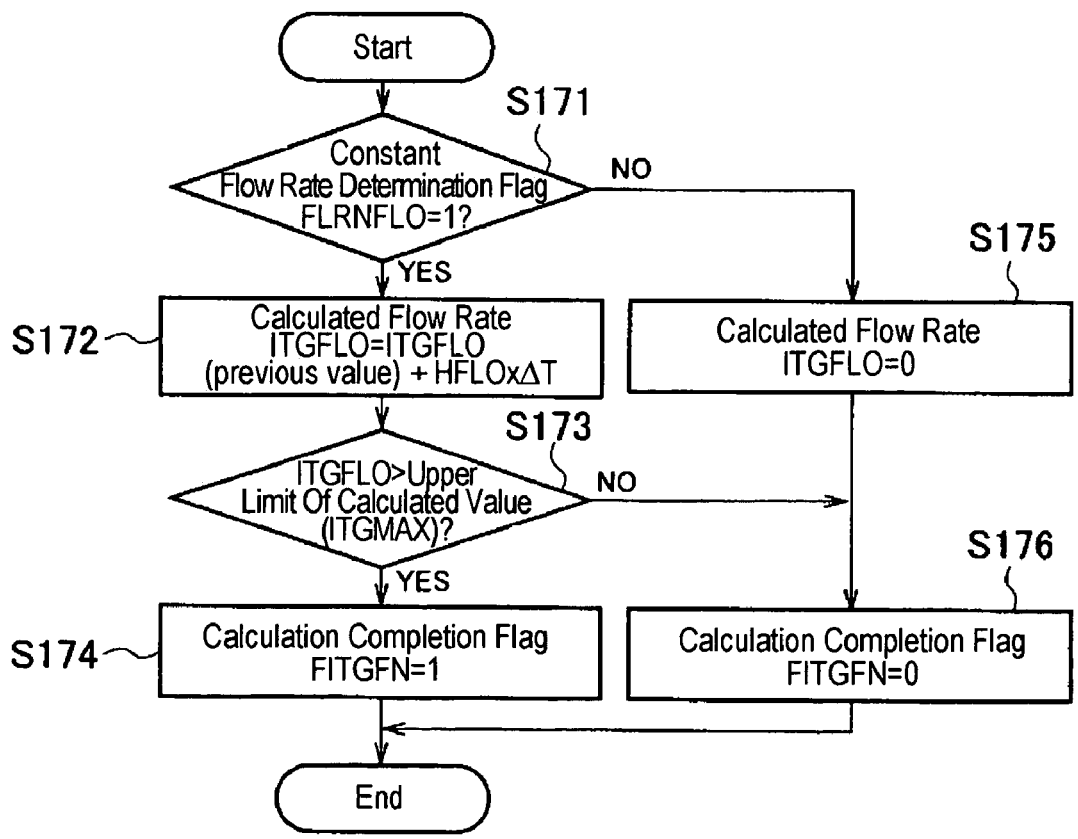
FIG. 23 illustrates a flowchart according to an embodiment of the present invention.

Referring now to FIG. 23, the process of step S96 is described in greater detail. As shown in FIG. 23, in a process for determining whether calculation is complete, flow rate learning determination unit 51 checks whether a "1" was assigned to constant flow rate continuation flag FLRNFLO in step S171. If so, the process proceeds to step S172.

In step S172, flow rate learning determination unit 51 determines the calculated current flow rate of hydrogen ITGFLO by adding a value, determined by multiplying a time interval (ΔT) and the current flow rate of hydrogen HFLO, to the previously calculated value of the flow rate of hydrogen ITGFLO. The calculation is performed by controller 23. In this way, flow rate learning determination unit 51 continually updates the calculated value of the flow rate of hydrogen ITGFLO at time interval (ΔT) as long as the constant flow rate continuation flag (FLRNFLO) remains "1."

In step S173, flow rate learning determination unit 51 checks whether the current calculated flow rate of hydrogen ITGFLO exceeds the specified upper limit of the calculated value (ITGMAX). When exceeding this value, a "1" is assigned to calculation completion flag FITGFN in step S1174 to complete the calculation. If not, a "0" is assigned to the calculation completion flag FITGFN in step S1176 to allow the calculation process to continue.

The upper limit calculated value ITGMAX is set to a maximum value corresponding to the number bits of calculated flow rate of hydrogen ITGFLO. This number of bits is set for ITGFLO when the flow rate of hydrogen supplied to fuel cell 21 from hydrogen tank 22 under normal power generation status, meets the time conditions described above.

If, in step S171, constant flow rate continuation flag (FLRNFLO) is not "1", which indicates that calculations are not being performed, flow rate learning determination unit 51 assigns a "0" to calculated flow rate of hydrogen ITGFLO in step S175. Then, in step S176, a "0" is assigned to calculation completion flag FITGFN.

Figure 24:
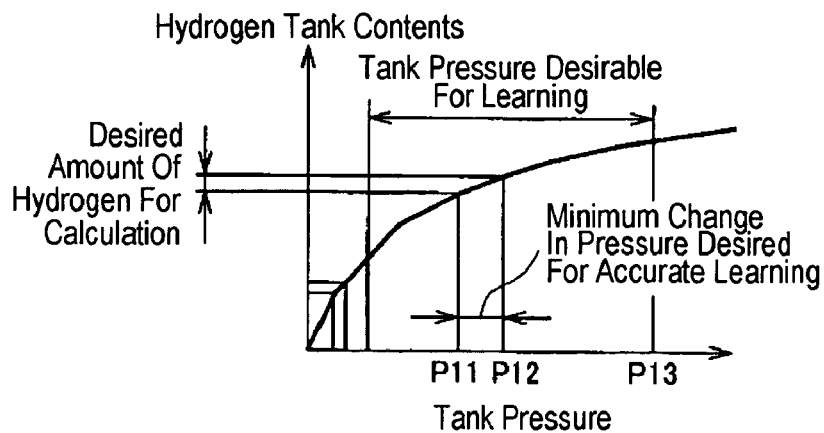
FIG. 24 illustrates a diagrammatical view according to an embodiment of the present invention.

In one embodiment, a calculated value for the flow rate of hydrogen ITGFLO, determined after a specified period or longer passes, allows a significant change in tank pressure to ensure calculation accuracy. For example, as shown in FIG. 24, a change in pressure from P11 to P12 in the allowable pressure range is desirable for environmental conditions, and the corresponding change in the quantity of hydrogen in tank 22 represents the minimum desired calculated flow rate of hydrogen ITGFLO. The desirable calculation time is determined by dividing the minimum desired calculated flow rate of hydrogen ITGFLO by the value obtained by multiplying the measured hydrogen flow rate per unit of time by the time units of controller 23.

Figure 25:
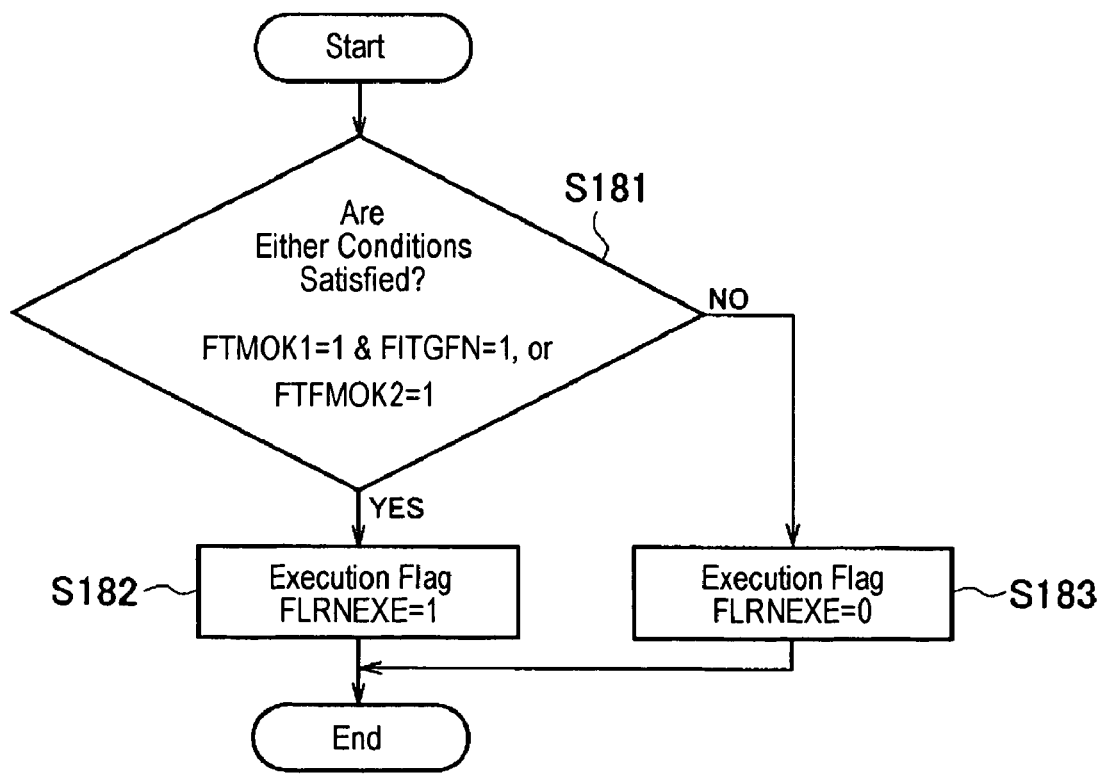
FIG. 25 illustrates a flowchart according to an embodiment of the present invention.

Step S97, as shown in FIG. 14, determines whether to conduct the learning process and assigns a learning execution flag reflecting this determination. FIG. 25 illustrates one embodiment of the process for assigning the learning execution flag. In step S181, flow rate learning determination unit 51 determines whether any of the following conditions are met to determine whether the learning process should be performed. First, both time conditions judgment flag FTM-FOK1 and calculation completion flag FITGFN are "1." Second, the time conditions learning permission flag FTM-FOK2 is "1."

In step S182, flow rate learning determination unit 51 checks if either the first or second condition, described above, is met. If so, the flow rate learning determination unit 51 assigns a "1" to learning execution flag FLRNEXE in step S182, allowing the learning process to be executed. If neither the first nor the second condition is met, a "0" is assigned to the learning execution flag FLRNEXE in step S183 and the learning process is not executed.

Figure 26:
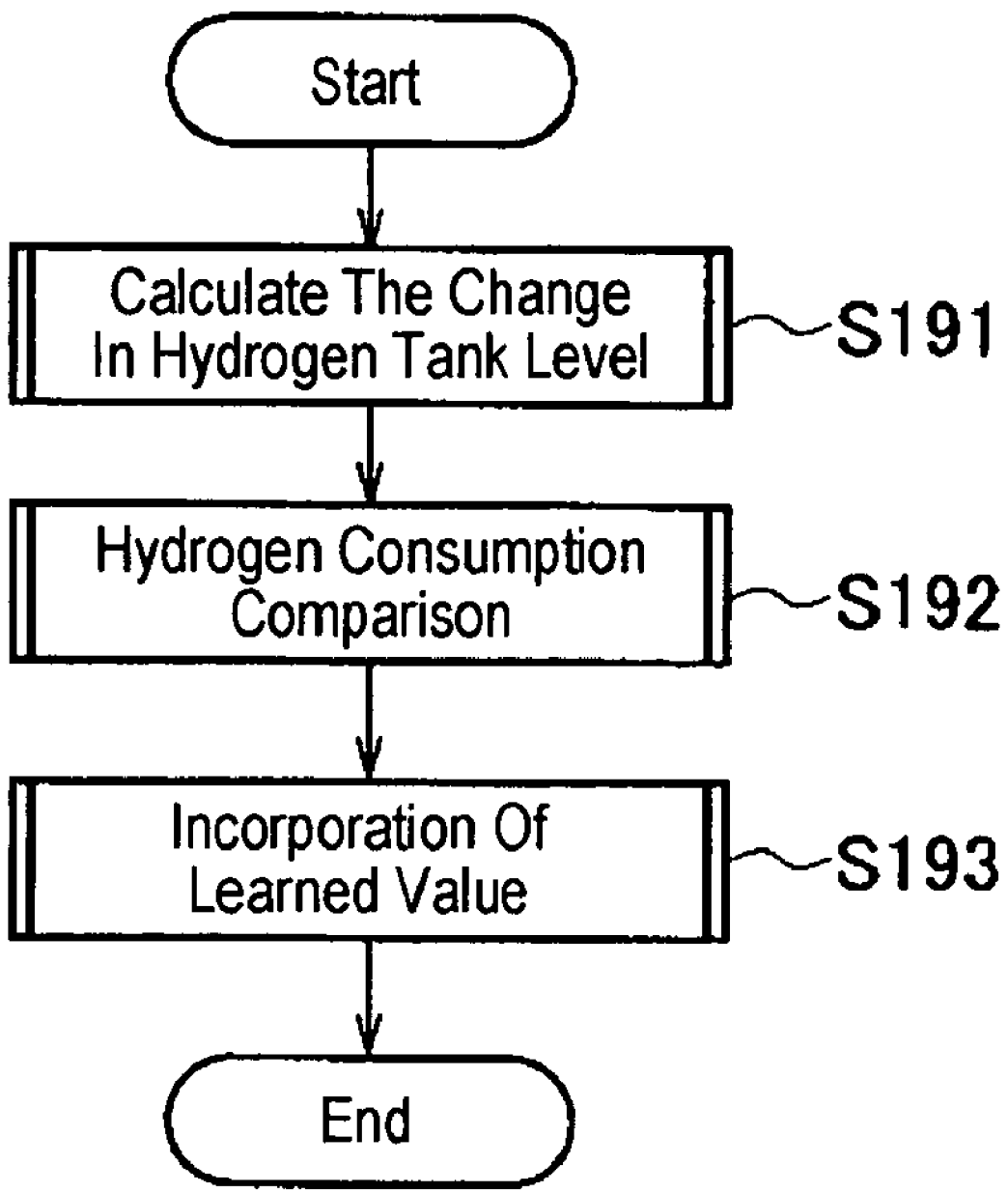
FIG. 26 illustrates a flowchart according to an embodiment of the present invention.

In FIG. 26, a learning process for determining the flow rate of hydrogen is described. Here, in step S192, the learning process calculates the change in the quantity of hydrogen in hydrogen tank 22 during a calculation process based on the flow rate of hydrogen over a time period. The time period is longer than the minimum desired time for calculation. In step S192, an error value is calculated by comparing the calculated value for the flow rate of hydrogen ITGFLO, determined in step S96, with the actual change in the quantity of hydrogen in the hydrogen tank 22. A learning process is then performed based on this error rate. The learning process for the flow rate of hydrogen is performed for each learning range RG determined within the operational hydrogen flow rate measurement range of fuel flow meter 41.

The details of processing in steps S191, S192 and S193 are now explained with reference to FIG. 27. In step S191, fuel flow rate learning unit 52 determines whether the value of constant flow rate judgment flag FTMFST is "1." The process of step S191 is further described with respect to FIG. 27. In step S201 of FIG. 27, the fuel flow rate learning unit 52 determines whether a "1" is assigned to FTMFST. If so, in step S202, the current tank pressure VPRS is stored as tank pressure (PVLST) when calculation begins, and the current tank temperature VTMP is stored as tank temperature (TVLST) at the start of calculation (step S203).

Next in step S204, fuel flow rate learning unit 52 calculates the tank quantity at the start of calculation based on the tank quantity map data as shown in FIG. 4 according to the tank pressure at the initiation of calculation PVLST and the tank temperature at the initiation of calculation TVLST, and assigns a "0" to a flag indicating a completion of the tank quantity calculation (QHVLFN) in step S205.

If learning execution flag FLRNEXE is determined not to be "1" in step S206, fuel flow rate learning unit 52, which is either in calculation or standby mode due to the conditions in step S181, determines in step S211 whether the tank quantity should be calculated by checking whether a "1" is assigned to flag FLRNFLO (which indicates that constant flow rate conditions are being maintained).

When the fuel flow rate learning unit 52 is calculating the tank quantity, the process proceeds to step S213. When FLRNFLO does not equal 1 and therefore the tank quantity is not being calculated, the process proceeds to step S212 and a "0" is assigned to a flag for the tank quantity at the start of calculation QHVLST. When FLRNFLO equals 1, a "0" is assigned to a flag for a tank quantity at the completion of calculation QHVLFN.

After a "0" is assigned to QHVLFN in steps S205 and S213, the process returns to the flow rate learning judgment process in step S81 without performing the processes in steps S192 and S193.

Figure 27:
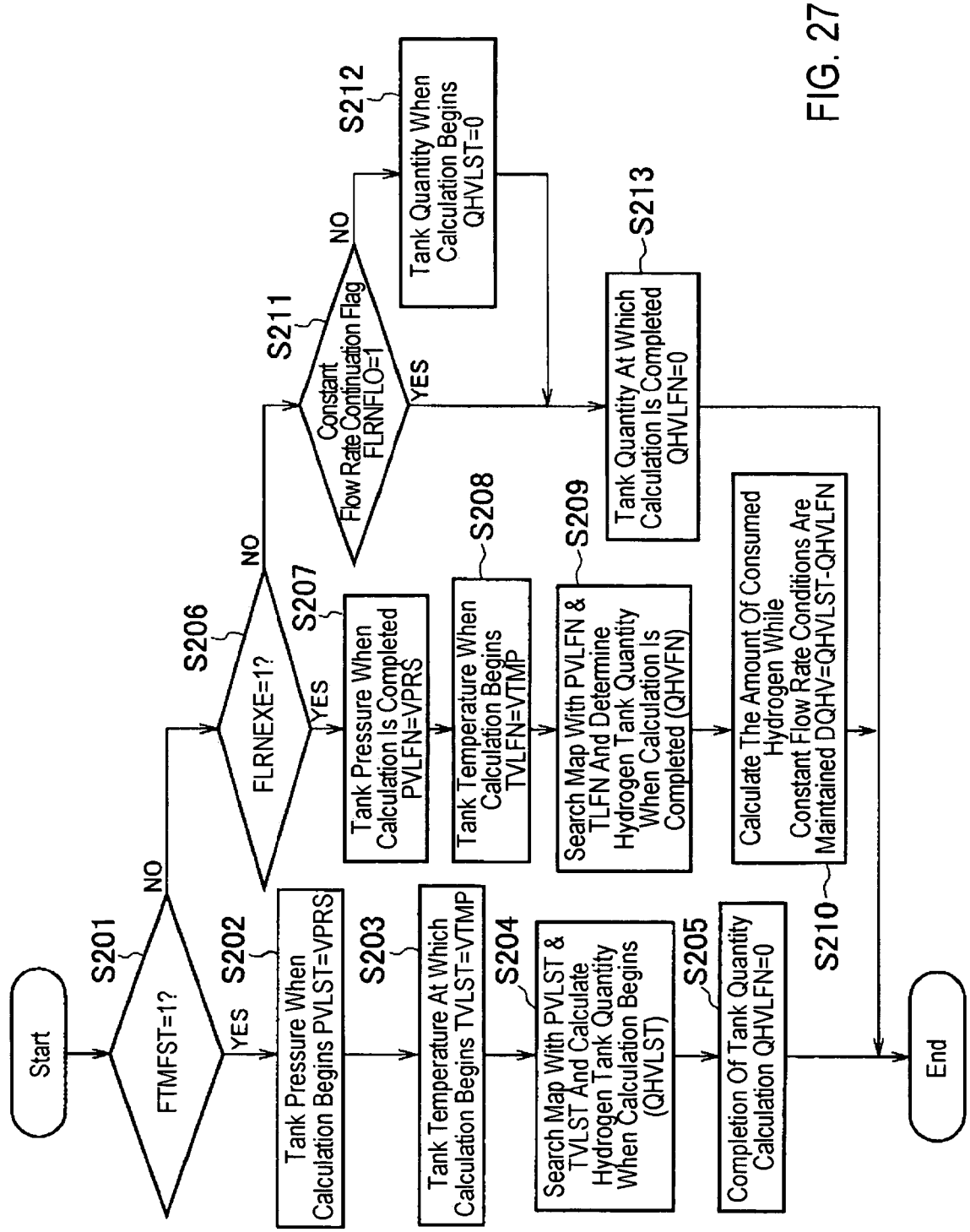
FIG. 27 illustrates a flowchart according to an embodiment of the present invention.

In step S191, the fuel flow rate learning unit 52, which calculates the tank quantity, repeatedly performs the steps outlined in the process above with respect to steps S201 through S205, step S206, and steps S211 through S213 of FIG. 27 as well as the flow rate learning judgment process. However, if constant flow rate judgment initiation flag FTMFST is not "1", fuel flow rate learning unit 52 in step S206 determines whether the tank quantity has been calculated by determining whether the value of learning execution flag FLRNEXE is a "1". If the tank quantity has been calculated, the tank pressure at this point VPRS is stored as the tank pressure after the completion of the calculation for PVLFN in step S207. The tank temperature VTMP at this point is stored as the temperature at the initiation of calculation (TVLFN) in step S208.

Fuel flow rate learning unit 52 calculates the tank quantity at the completion of calculation (QHVLFN) in step S209, based on the tank pressure after the completion of calculation (PVLFN) and the tank temperature after the completion of calculation (TVLFN), according to the tank quantity map data in FIG. 4. In step S210, the difference between the tank quantity at the completion of calculation QHVLFN, determined in step S209, and the tank quantity at the initiation of calculation QHVLST, determined in step S204, is calculated. The difference between these values represents the quantity of hydrogen that has been consumed while the constant flow rate conditions have been maintained. This value is stored as the quantity of hydrogen consumed during the calculation.

Fuel flow rate learning unit 52 proceeds to hydrogen consumption comparison as shown in step S192 in FIG. 26, and compares the calculated hydrogen flow rate described above in the calculation completion judgment process in FIG. 13 to the calculation results for the change in tank quantity based on the change in the physical characteristics or conditions of tank 22 and the hydrogen in the tank during the calculation process.

Figure 28:
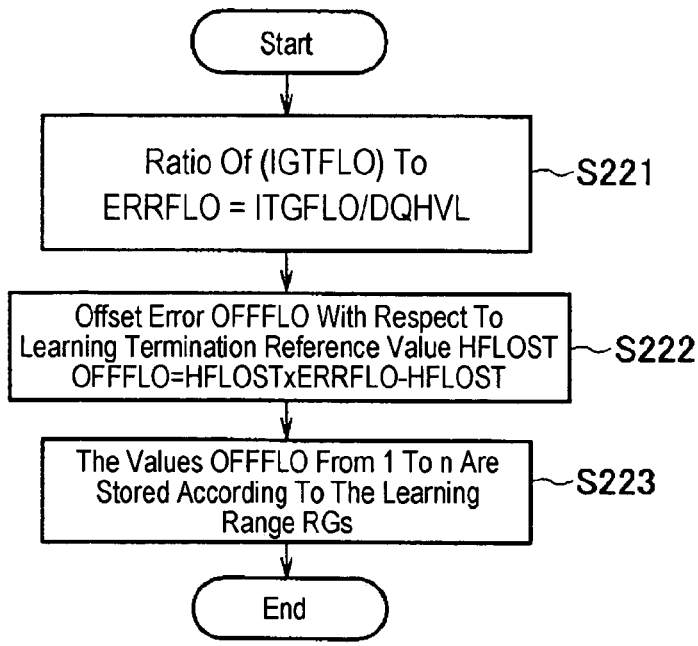
FIG. 28 illustrates a flowchart according to an embodiment of the present invention.

As shown in FIG. 28, in step S221, the error rate ERRFLO for the calculated flow rate of hydrogen determined in step S172 is calculated with respect to the hydrogen tank quantity determined in step S210 according to the following formula:

$$ERRFLO=ITGFLO/DQHVL$$

In step S222, fuel flow rate learning unit 52 calculates the offset error OFFFLO to determine a sensor error reference value. The offset error is based on the learning termination reference value HFLOST for determining constant flow rate conditions and error rate ERRFLO determined in step S221 according to the following formula:

$$OFFFLO=HFLOST \times ERRFLO-HFLOST$$

Next, in step S223, fuel flow rate learning unit 52 stores the offset error OFFFLO (RG) obtained in step S222 within the memory range that corresponds to the learning range RG according to the learning termination reference value HFLOST. The fuel flow rate learning unit 52 stores the offset errors OFFFLO (1 to n) according to the learning range RGs, and it allows the process to proceed to step S193 in FIG. 26.

Figure 29:
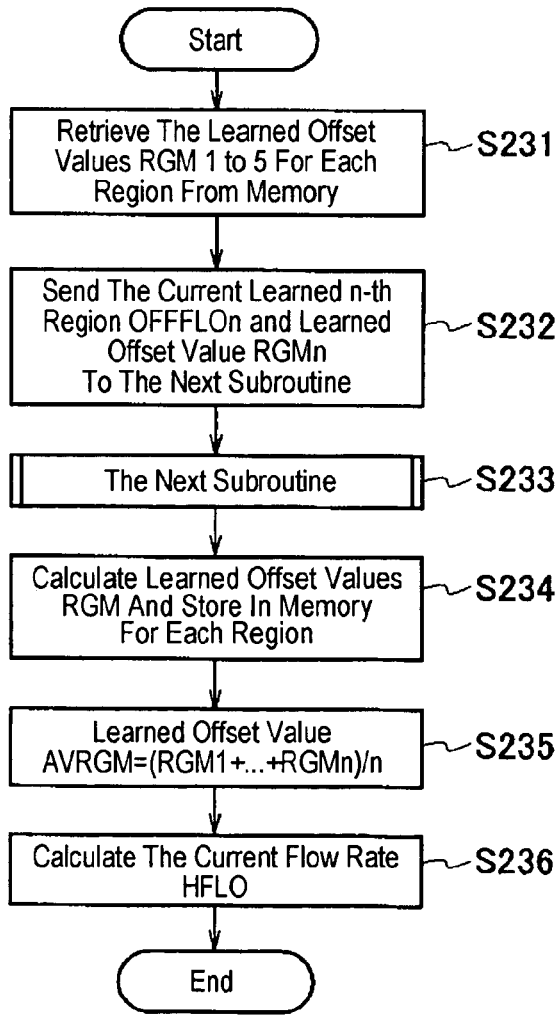
FIG. 29 illustrates a flowchart according to an embodiment of the present invention.
Figure 30:
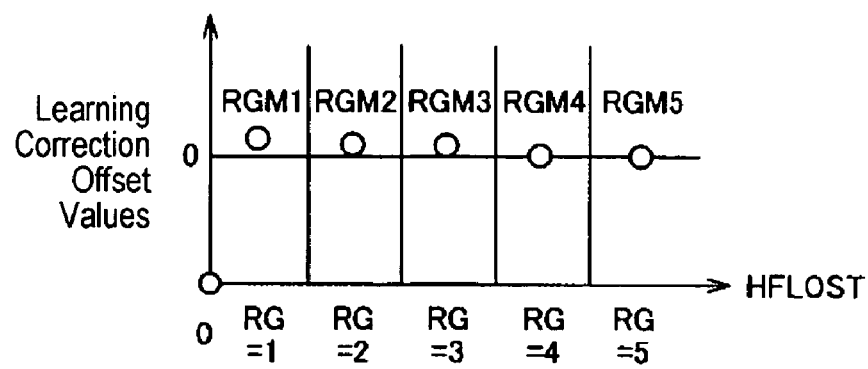
FIG. 30 illustrates a diagrammatical view according to an embodiment of the present invention.

With reference to FIG. 29, step S193 of FIG. 26 is described in greater detail. In step S231, the learned value incorporation process reads the quantity of learned offset value RGMn that corresponds to the current learning termination reference value HFLOST utilizing the offset errors OFFFLO RGM (1 to n) based on tank quantity map data. The tank quantity map data includes learned offset values related to learning termination reference values HFLOST as shown in FIG. 30. This learned offset value RGMn will be described later. The value is used to determine a learned offset value to correct sensor flow rate before learning. In the map data, the value of learned offset value (RGM 1 to 5 . . . ) is stored according to learning RG (1 to 5 . . . ) in the map data as shown in FIG. 30.

In step S232, fuel flow rate learning unit 52 reads the current offset error OFFFLOn that was stored in step S223 as described above, and provides that value as well as learned offset value RGMn that were read in step S231 to processing step S233.

Figure 31:
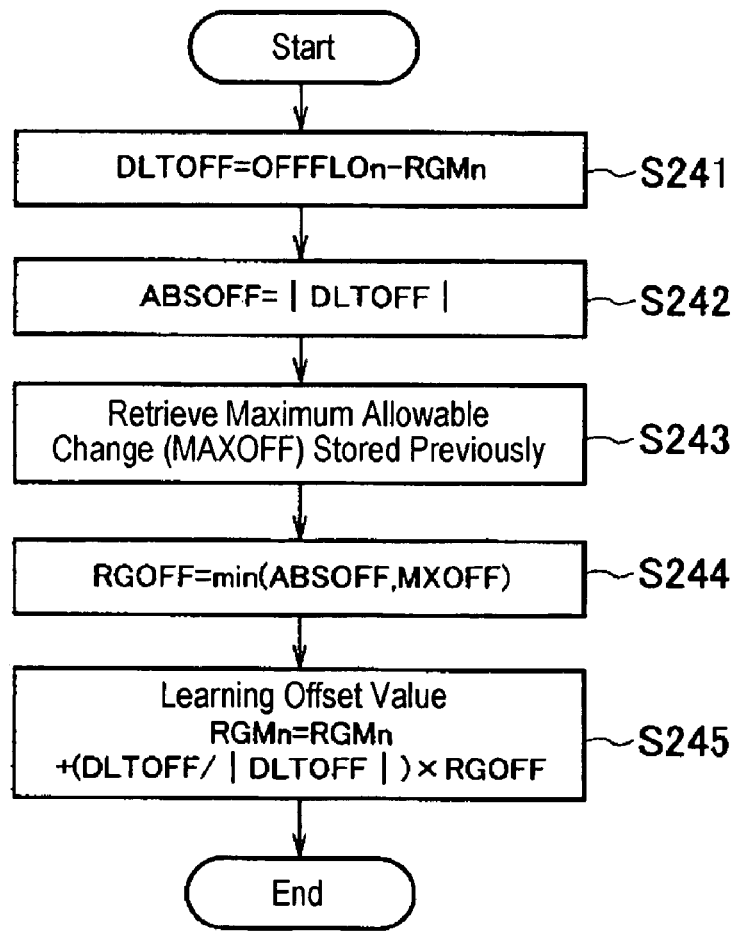
FIG. 31 illustrates a flowchart according to an embodiment of the present invention.
Figure 32:
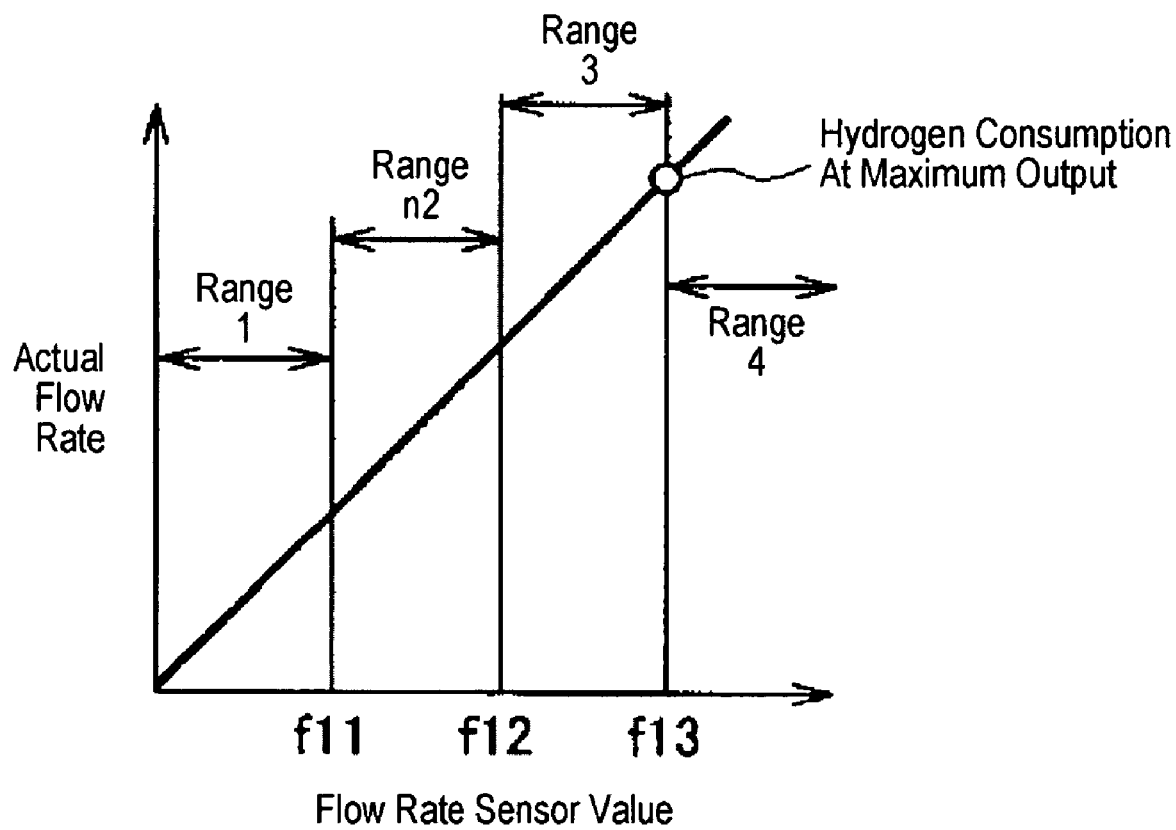
FIG. 32 illustrates a diagrammatical view according to an embodiment of the present invention.

Referring to FIG. 31, step S233 is described in greater detail. Here, fuel flow rate learning unit 52 performs a learned value calculation to correct the learned offset value RGMn that was read from the map data. In step S241 of this learned value calculation process, the fuel flow rate learning unit 52 determines the amount of difference between offset errors OFFFOn and the learned offset value RGMn. In step S242, an absolute value of ABSOFF is calculated for the difference DLTOFF.

In step S243, fuel flow rate learning unit 52 reads the maximum allowable change saved, and stores whichever is the lower of the absolute value ABSOFF or the maximum allowable quantity of change MXOFF as correction coefficient RGOFF for each learning range RG in the current calculation. Fuel flow rate learning unit 52 determines the current learning offset value RGMn in step S245 by utilizing the learned offset value that was determined in step S231 according to the following formula:

$$RGMn+(DLTOFF/IDLTOFFI) \times RGOFF$$

Referring back to FIG. 29, in step S234, fuel flow rate learning unit 52 stores the current learned offset value RGMn that was determined in step S245. In step S235, the fuel flow rate learning unit 52 calculates the learned offset value AVRGM to correct the flow rate measured by the sensor HFLOSEN before learning in step 236. The calculation is performed according to the following formula:

$$AVRGM=(RGM1+ \ldots +RGMn)/n$$

In step S236, the current flow rate is calculated. In this process, fuel flow rate learning unit 52 allows the learned offset value to be incorporated into the flow rate of hydrogen HFLO by correcting the flow rate measured by the sensor HFLOSEN before learning by the learned offset value AVRGM. This process is performed according to the following formula:

$$HFLO=HFLOSEN+AVRGM$$

That is, fuel flow rate learning unit 52 determines the amount of error compared to the difference in value between the calculated value and the measured flow rate with respect to tank 22 for each learning range RG. The calculated value is added to the measured quantity of hydrogen, measured by fuel flow meter 41, as the mean value of the error for the entire learning range RG (quantity of learned offset: AVRGM).

In this manner, fuel flow rate learning unit 52 corrects the measured flow rate by the sensor HFLOSEN before learning as shown in FIG. 18. In FIG. 18, pre-learning is indicated by a solid line. The current flow rate of hydrogen HFLO indicated by a dotted line. The fuel flow rate learning unit 52 determines the measured value of hydrogen (HFLO) for each range and determines the actual flow rate by correcting for the error in the measured value (measured by fuel flow meter 41). Consequently, the supply of hydrogen from hydrogen tank 22 to fuel cell 21 can be measured accurately.

Figure 33:
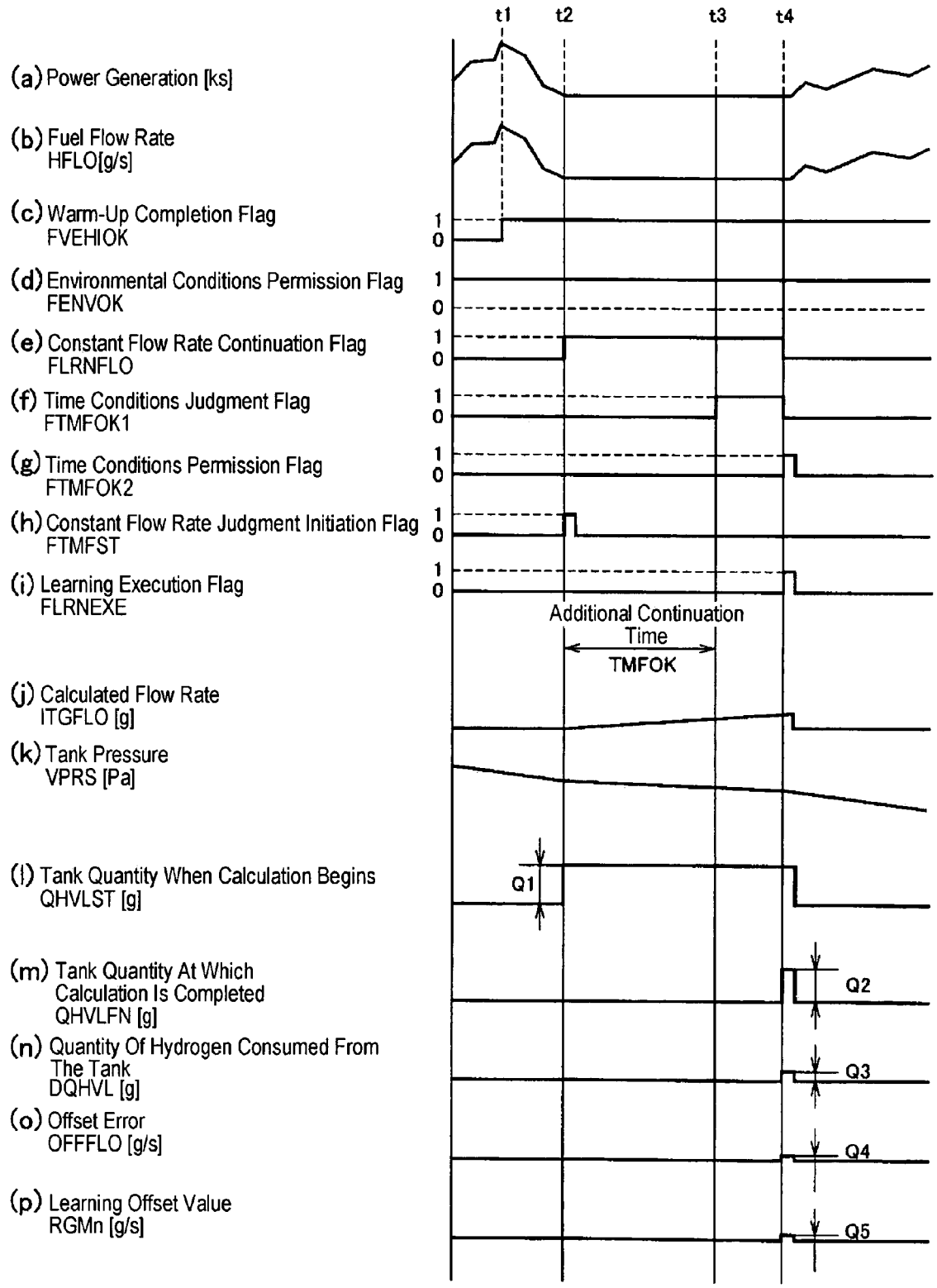
FIG. 33 is a timing chart according to an embodiment of the present invention.

Referring now to FIG. 33, an example for the operation of fuel cell vehicle 1 with respect to the processes in steps S81 and S82, described above, is provided. In the example, tank pressure VPRS (Pa) is gradually decreased (FIG. 33($k$)) according to the change in the quantity of power generation [ks] (FIG. 33($a$)) and change in flow rate of hydrogen into fuel cell 21 (HFLO) [g/s] (FIG. 33($b$)). When the warm-up and environmental conditions are met at time t1, a "1" is assigned to warm-up completion flag FVEHIOK (FIG. 33($c$)) and environmental conditions permission flag FENVOK (FIG. 33($d$)).

When the hydrogen flow rate measured by fuel flow meter 41 is confirmed to be within the specified range at time t2, a "1" is assigned to constant flow rate judgment initiation flag FTMFST as a trigger (FIG. 33($h$)), a "1" is also assigned to constant flow rate continuation flag FLRNFLO (FIG. 3($e$)). At time t2, the tank quantity at the start of calculating the flow rate (QHVLST[g])) is calculated based on the tank pressure VPRS and the temperature VTMP and is stored as Q1 (FIG. 33($l$)). When warm-up, environmental, and constant flow conditions are all met, the process for calculating hydrogen flow rate is initiated, and the calculated flow rate of hydrogen (ITGFLO[g]) is constantly repeated FIG. 33($j$).

At time t3, after the time needed to maintain a constant flow rate TMFOK has passed from t2, a "1" is assigned to time conditions flag FTMFOK1 (FIG. 33($f$)). When the constant flow rate conditions are maintained, the process proceeds to time t4. At time t4, when the value of the calculated flow rate of hydrogen ITGFLO becomes greater than the upper limit of the calculated value ITGMAX, a "1" is assigned to time conditions learning permission flag FTMFOK2 (FIG. 33($g$)), a "1" is also assigned to learning execution flag FLRNEXE (FIG. 33($i$)). Then, the calculation is completed, and the hydrogen tank quantity (Q) when the calculation is completed is stored (FIG. 33($m$)) with respect to the tank pressure VPRS and the tank temperature VTMP at time t4. (FIG. 33($m$)).

The difference between the hydrogen tank quantity at the end of the calculation process (QHVLFN) and the hydrogen tank quantity at the initiation of the calculation process (QHVLST) is determined as Q3, which is the quantity of hydrogen consumed from inside the tank (DQHVL) from time t2 through t4 (FIG. 33($n$)).

The difference (Q4) between the quantity of consumed hydrogen (DQHVL) and the value of the calculated flow rate of hydrogen ITGFLO is the difference in offset error (OFFFLO [g/s]) (FIG. 33($o$)). Accordingly, the value of the learned offset RG (RGMn [g/s]) of learning range RG can be determined according to the flow rate of hydrogen from t2 to t4. Consequently, it is possible to determine the learned quantity of offset AVRGM from learned offset value RGMn and to correct the flow rate measured by the sensor HFLOSEN before learning measured by flow meter 41.

A fuel supply system according to another embodiment of the present invention is now described. For clarity, the description of elements described in connection with the previous embodiments are omitted and like numerals are used for like elements.

Figure 34:
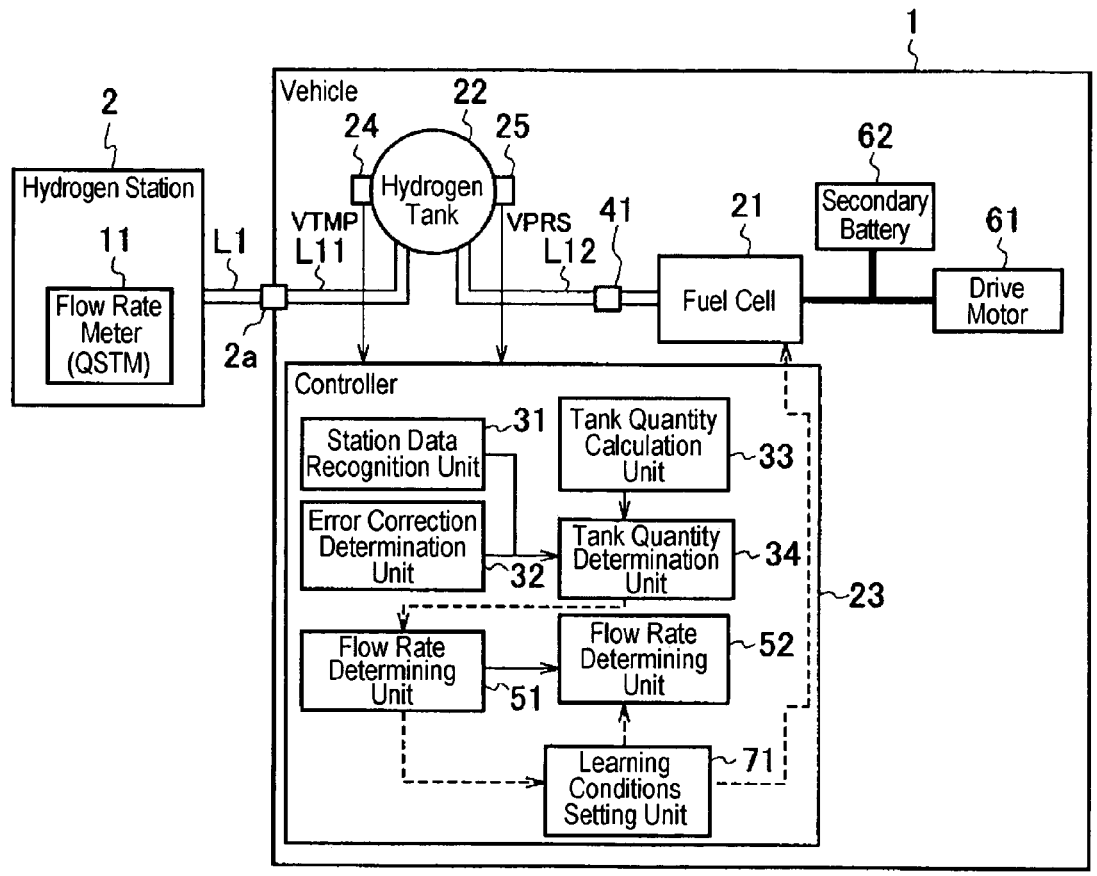
FIG. 34 illustrates a schematic view according to an embodiment of the present invention.

As shown in FIG. 34, the fuel supply system is connected to drive motor 61 and secondary battery 62 via a power supply line, and learning condition setting unit 71 is provided to controller 23.

The fuel supply system with the learning conditions setting unit 71 restricts the operation of fuel cell 21 so that the power generation of that fuel cell matches the criteria for learning the hydrogen flow rate established by flow rate learning unit 51.

Figure 35:
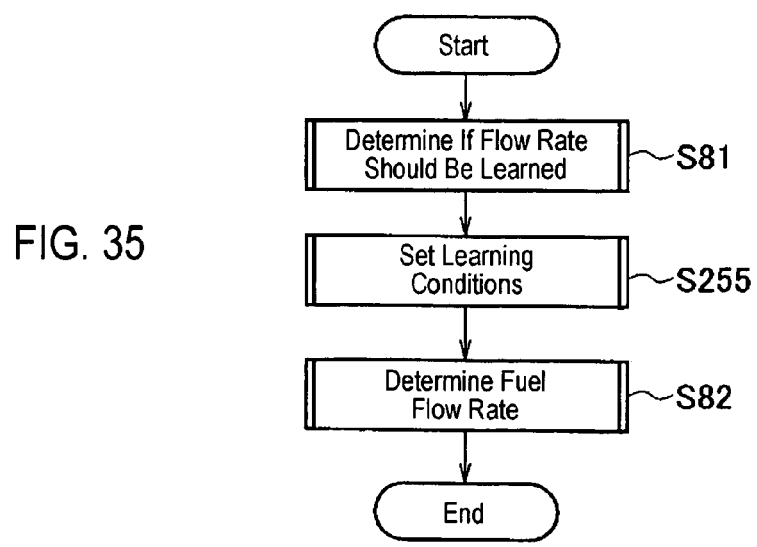
FIG. 35 illustrates a flowchart according to an embodiment of the present invention.

The fuel supply system learns the flow rate of hydrogen as shown in FIG. 35. In this process, processing as described in FIGS. 14 to 24 is performed by flow rate learning unit 51 in step S81, and determination as to whether learning is to be performed according to each condition is carried out based on the measurements of fuel flow meter 41.

Learning condition judgment unit 71 sets learning conditions to correct the value measured by fuel flow meter 41 measurements in step S251 before allowing the system to proceed to the processes described in FIGS. 25 to 32 that are carried out by fuel flow rate learning unit 52 in step S82. In an embodiment, the hydrogen flow rate learning process is carried out while the vehicle is moving and drive motor 61 is generating driving torque. Motor 61 receives electric power generated by fuel cell 21 and secondary battery 62, while adjusting the power generation of fuel cell 21 according to power generation instructions.

In step S255, learning condition setting unit 71 checks whether the quantity of power generated by fuel cell 21 can be maintained under actual use conditions. When true, constant power is generated by fuel cell 21. If additional power is required for accessory parts while the vehicle is moving at a constant speed, learning condition setting unit 71 instructs secondary battery 62 to supply power to those accessory parts as required so that the quantity of power generated by fuel cell 21 remains constant and not diverted to the accessory parts.

Figure 36:
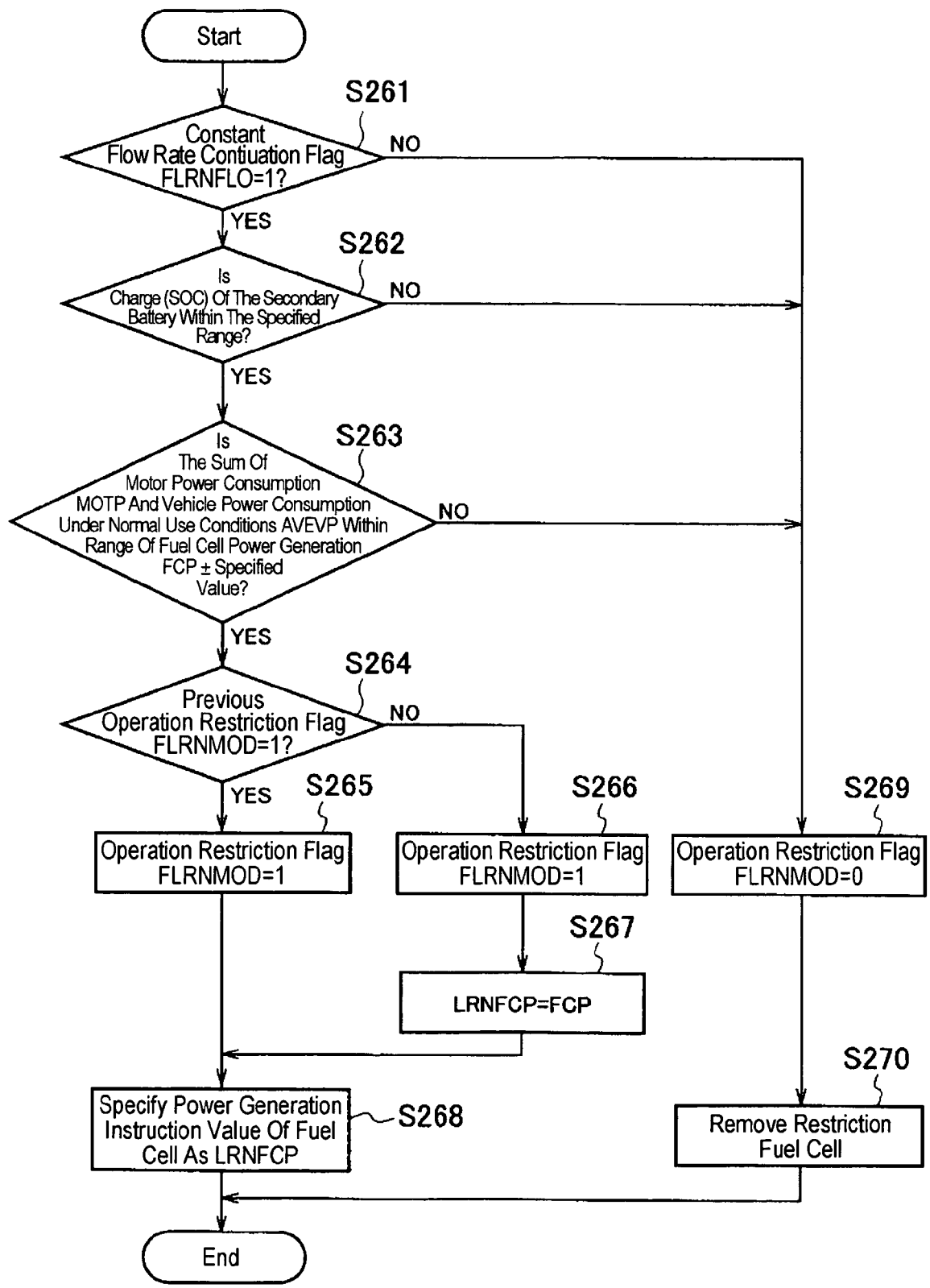
FIG. 36 illustrates a flowchart according to an embodiment of the present invention.

As shown in FIG. 36, in the learning condition setting process, learning condition setting unit 71 determines whether a "1" was assigned to FLRNFLO flag in the constant flow rate judgment process in FIG. 17, indicating that constant flow rate conditions are maintained. The step checks whether fuel cell 21 is generating a constant power. If so, learning condition unit 71 allows the process to proceed to step S262.

In step S262, learning condition judgment unit 71 checks whether the charge in secondary battery 62 (SOC) is within a desired range by monitoring a signal is from an SOC (State Of Charge) sensor in the secondary battery. When the power consumption of the accessory parts increases while constant power generation by fuel cell 21 is maintained and power is supplied to the accessory parts by secondary battery 62, a range corresponding to the increased power requirements is set. Then, if the SOC falls within this range, learning conditions judgment unit 71 allows the process to proceed to step S263.

In step S263, learning condition setting unit 71 checks whether the power consumption under normal use conditions AVEVP, set to the current power consumption of drive motor 61 (motor power consumption MOTP), is within a specified range. The range is defined by the current quantity of fuel cell power generation FCP plus and minus a given value. If AVEVP is within the specified range, the system proceeds to step S264. In one embodiment, power consumption under normal conditions AVEVP is determined experimentally, and refers to the power consumption of all accessory parts that receive power from fuel cell 21 and secondary battery 62.

As described above, by conducting steps S261, S262, and S263, the system checks whether accessory power needs may be compensated for by supplying power from secondary battery 62 while maintaining constant power generation from fuel cell 21, and charging secondary battery 62 with excess energy even if there is a change in energy consumption by the motor or accessories while the hydrogen flow rate is being determined.

In step S264, learning condition setting unit 71 checks whether the operation of fuel cell 21 is currently restricted by ascertaining if a "1" was assigned to operation restriction flag FLRNMOD in the previous learning setting process. If the operation is being restricted, a "1" is assigned to FLRNMOD in step S265. If the operation is not currently restricted, a "1" is assigned to FLRNMOD flag in step S266, and the current quantity of power generation of fuel cell 21 (FCP) is set to the learned power generation LRNFCP in step S267. LRNFCP corresponds to the constant amount of power at which the flow rate of hydrogen is determined.

In step S268, learning condition setting unit 71 outputs an instruction value for the amount of power (learned power generation: LRNFCP) to the inverter or other element that extracts power from fuel cell 21. Consequently, power generation of fuel cell 21 is restricted to maintain the quantity at which a "1" was assigned to flag (FLRNFLO).

When all the conditions in steps S261 to S263 are met, constant flow rate continuation flag FLRNFLO is set, and power generation of fuel cell 21 is restricted to maintain the quantity at which a "1" was assigned to flag (FLRNFLO).

When any of the conditions in steps S261 to S263 are not met, learning condition setting unit 71 assigns a "0" to the operation restriction flag FLRNMOD in step S269. The instruction value for power generation of fuel cell 21 is canceled to complete the processing if the power generation of fuel cell 21 was restricted in the previous learning condition setting process.

Figure 37:
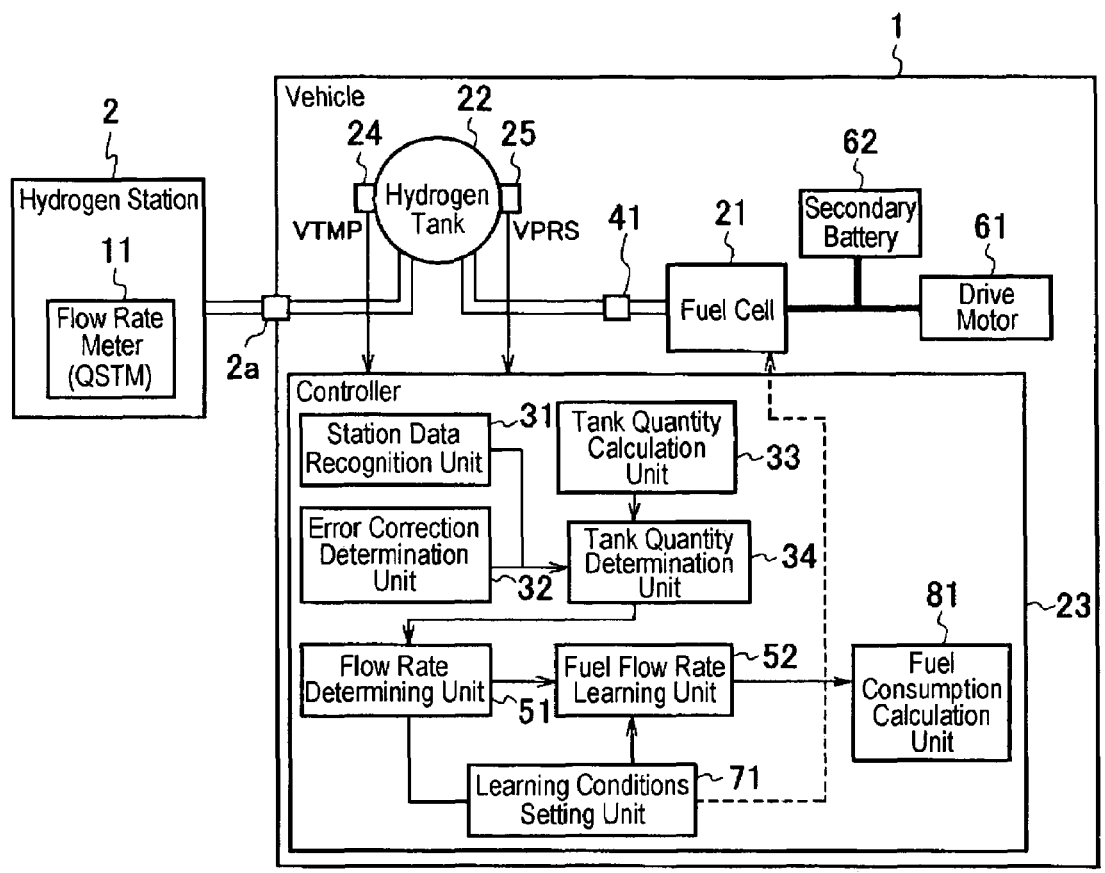
FIG. 37 illustrates a schematic view according to an embodiment of the present invention.

In another embodiment, as shown in FIG. 37, controller 23 is provided with fuel consumption calculation unit 81. In an embodiment, fuel consumption calculation unit 81 calculates a mean fuel consumption based on the distance driven and the calculated hydrogen flow rate, as well as the instantaneous fuel consumption based on the instantaneous fuel flow rate and vehicle speed.

Figure 38:
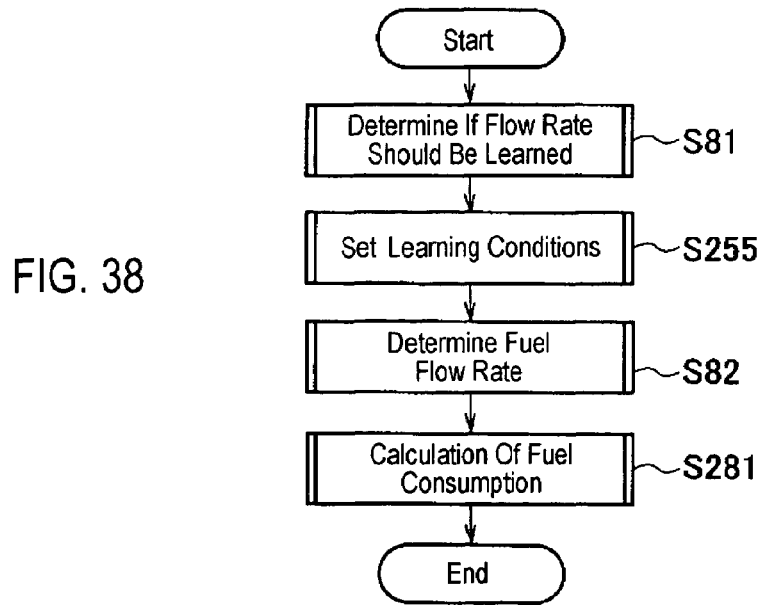
FIG. 38 illustrates a schematic view according to an embodiment of the present invention.

Referring to FIG. 38, a process is set forth for calculating the fuel consumption. As shown in FIG. 38, unit 81 calculates fuel consumption in step S281 after the flow rate of hydrogen measured by fuel flow meter 41 is corrected in steps S81, S251, S82 during the hydrogen flow rate learning process.

Figure 39:
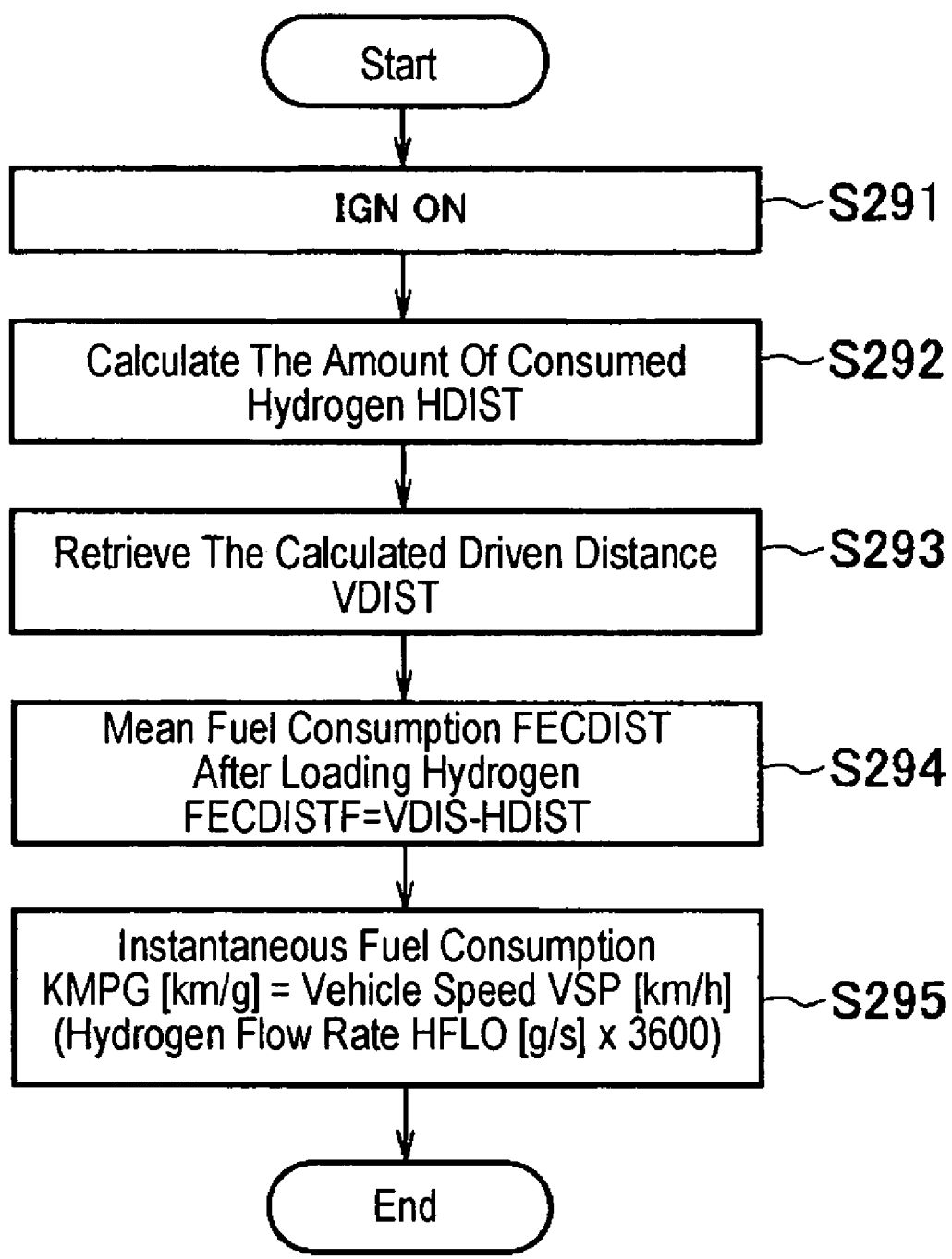
FIG. 39 illustrates a flowchart according to an embodiment of the present invention.

As shown in FIG. 39, after confirming in step S291 that the ignition switch SW is in the ON position, in step 292, fuel consumption calculation unit 81 calculates the hydrogen tank quantity based on the current tank pressure VPTMAX and tank temperature VTTMAX immediately after hydrogen is supplied in the final supply process. The fuel consumption calculation unit 81 inputs the sensor signals from temperature sensor 24 and pressure sensor 25, and calculates the current tank quantity from the current tank pressure VPRS and temperature (VTEMP). The quantity of hydrogen consumption (HDIST) is calculated by comparing the tank quantity immediately after filling with the current tank quantity.

In step S293, fuel consumption calculation unit 81 retrieves the calculated mileage since the last hydrogen filling from memory, and stores it as the calculated driven distance VDIST.

In step S293, fuel consumption calculation unit 81 calculates the mean fuel consumption FECDIST during the period from last hydrogen filling to the present by utilizing the calculated result of driven distance VDIST stored in step S293. Fuel consumption calculation unit 81 calculates the mean fuel consumption according to the following formula:

$$FECDIST=VDIST/HDIST$$

In step S295, fuel consumption calculation unit 81 calculates the instantaneous fuel consumption KMPG based on the current vehicle speed VSP and the hydrogen flow rate HFLO according to the sensor signal. Fuel consumption calculation unit 81 calculates the instantaneous fuel consumption according to the following formula:

$$KMPG[km/g]=VSP[km/h]/(HFLO[g/s]\times 3600)$$

It should be noted that, although flags indicating "1" and "0" have been used in the present application, such logical conditions may be reversed such as, for example, a "0" may be used to indicate that a flag condition is positive. Additionally, any other logical or software algorithmic processing may be used other than that disclosed in the present application.

The entire contents of Japanese Patent Publication No. 2001-295996 and Japanese Patent Application No. 2004-092710 (filed on Mar. 26, 2004) are incorporated herein by reference.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A device for calculating a quantity of fuel in a fuel tank for a fuel cell vehicle, the device comprising:
   a first quantity determining system that provides a first quantity value representing said quantity of fuel in said fuel tank based on a physical condition associated with said fuel in said fuel tank;
   a second quantity determining system that provides a second quantity value representing said quantity of fuel in said fuel tank; and
   a tank quantity determination system that generates an error value based on the first quantity value and the second quantity value;
   wherein the tank quantity determination system is capable of generating a corrected quantity value based on the error value and wherein the device further includes a manual input device that permits a user to provide the second quantity value.

2. The device according to claim 1, further comprising an error correction determination system that determines whether to generate the corrected quantity value based on the error value and an error rate, wherein the error rate is based on the first quantity value and the second quantity value.

3. The device according to claim 2, wherein the error correction determination system allows the corrected quantity value to be generated when:
   the second quantity value is greater than a given value; and
   a difference between the first quantity value and the second quantity value is within a range, wherein the range is based on a physical condition associated with said fuel and said fuel tank.

4. The device according to claim 1, wherein the second quantity determining system further comprises:
   a flow meter adapted to read a fuel flow rate of fuel supplied from a filling station to said fuel tank;
   wherein the second quantity determining system is adapted to calculate the second quantity value based on the fuel flow rate.

5. The device according to claim 4, wherein the first quantity value is determined using van der Walls formula and a pressure and temperature associated with said fuel in said fuel tank.

6. The device according to claim 5, wherein the fuel comprises hydrogen.

7. The device according to claim 1, further comprising:
   a fuel cell supply fuel flow meter that provides a first fuel cell supply value representing a flow rate of fuel supplied from said fuel tank to a fuel cell of said fuel cell vehicle; and
   a fuel flow rate learning system that obtains a second fuel cell supply value for fuel supplied from said fuel tank to said fuel cell based on a physical condition associated with said fuel in said fuel tank;
   wherein the fuel flow rate learning system is capable of generating a corrected fuel cell supply value based on a supply error value that is generated based on the first fuel cell supply value and the second fuel cell supply value.

8. The device according to claim 7, further comprising a flow rate determining system that determines whether the corrected fuel cell supply value should be generated.

9. The device according to claim 8, wherein the flow rate determining system determines whether the first fuel cell supply value should be corrected based on whether constant fuel flow rate conditions exist for a given time period.

10. The device according to claim 8, wherein the flow rate determining system determines whether the first fuel cell supply value should be corrected based upon the existence of warm up or environmental conditions for a given period of time.

11. The device according to claim 10, wherein the conditions are determined using van der Walls formula and a pressure and temperature associated with said fuel in said fuel tank.

12. The device according to claim 8, wherein the fuel flow rate learning system:
   determines the supply error value based on a difference between the first fuel cell supply value and the second fuel cell supply value for each of a plurality of learning ranges; and
   adds a mean error over the plurality of learning ranges to generate the corrected fuel cell supply value.

13. The device according to claim 8, further comprising:
   a power distributing system that stores power generated by a fuel cell in a secondary battery;
   wherein the power distributing system restricts power generation to allow the flow rate determining system to allow the first fuel cell supply value to be corrected; and further wherein the power distributing system instructs the secondary battery to supply power for operation of said fuel cell vehicle.

14. The device according to claim 13, wherein the power distributing system restricts power generation by the fuel cell to a specified quantity to maintain constant flow rate conditions for at least a minimum period of time after constant flow rate conditions are confirmed.

15. The device according to claim 7, further comprising a system that determines a mean fuel consumption based on a change in the corrected fuel cell supply value.

16. The device according to claim 7, further comprising a fuel consumption calculation system that determines an instantaneous fuel flow rate based on the corrected fuel cell supply value.

17. The device according to claim 16, wherein the fuel consumption calculation system calculates a speed associated with said fuel cell vehicle.

18. A method for calculating a quantity of fuel in a fuel tank for a fuel cell vehicle, the method comprising:
provided a first quantity value representing said quantity of fuel in said fuel tank based on a physical condition associated with said fuel in said fuel tank;
providing a second quantity value representing the quantity of fuel in said fuel tank;
generating an error value based on the first quantity value and the second quantity value;
generating a corrected quantity value based on the error value; and
calculating the second quantity value based on a fuel flow rate measured by a fuel flow meter.

19. The method according to claim 18, further comprising determining whether to generate the corrected quantity value based on an error rate, wherein the error rate is based on the first quantity value and the second quantity value.

20. The method according to claim 19, wherein the corrected quantity value is generated when:
the second quantity value is greater than a given value; and
a difference between the first quantity value and the second quantity value is within a range, wherein the range is based on a physical condition associated with said fuel in said fuel tank.

21. The method according to claim 18, wherein the first quantity value is determined using van der Walls formula and a pressure and temperature associated with said fuel in said fuel tank.

22. The method according to claim 21, wherein the fuel comprises hydrogen.

23. The method according to claim 18, further comprising:
providing a first fuel cell supply value representing a flow rate of fuel supplied from said fuel tank to a fuel cell of said fuel cell vehicle;
providing a second fuel cell supply value for fuel supplied from said fuel tank to said fuel cell based on a physical condition associated with said fuel in said fuel tank; and
generating a corrected fuel cell supply value based on a supply error value generated based on the first fuel cell supply value and the second fuel cell supply value.

24. The method according to claim 23, further comprising determining whether the corrected fuel cell supply value should be generated.

25. A device for calculating a quantity of fuel in a fuel tank for a fuel cell vehicle, the device comprising:
a means for calculating a first value representing said quantity of fuel in said fuel tank based on a physical condition associated with said fuel in said fuel tank;
a means for generating a second value representing said quantity of fuel in said fuel tank;
a means for generating an error value based on the first quantity value and the second quantity value and generating a corrected quantity value based on the error value;
a means for supplying a first fuel cell supply value representing a flow rate of fuel supplied from said fuel tank to a fuel cell of said fuel cell vehicle; and
a means for obtaining a second fuel cell supply value for fuel supplied from said fuel tank to said fuel cell based on a physical condition associated with said fuel in said fuel tank.

26. The device according to claim 25, further comprising a means for determining whether to generate the corrected quantity value based on an error rate.

27. The device according to claim 26, wherein the error rate is based on the first quantity value and the second quantity value.

28. The device according to claim 25, wherein the means for obtaining a second fuel cell supply value generates a corrected fuel cell supply value based on a supply error value that is obtained based on the first fuel cell supply value and the second fuel cell supply value.

29. A device for calculating a quantity of fuel in a fuel tank for a fuel cell vehicle, the device comprising:
a first quantity determining system that provides a first quantity value representing said quantity of fuel in said fuel tank based on a physical condition associated with said fuel in said fuel tank;
a second quantity determining system that provides a second quantity value representing said quantity of fuel in said fuel tank; and
a tank quantity determination system that generates an error value based on the first quantity value and the second quantity value;
wherein the tank quantity determination system is capable of generating a corrected quantity value based on the error value wherein the second quantity determining system further includes, a flow meter adapted to read a fuel flow rate of fuel supplied from a filling station to said fuel tank, wherein the second quantity determining system is adapted to calculate the second quantity value based on the fuel flow rate.

* * * * *